(12) United States Patent
Solodovnik

(10) Patent No.: US 11,842,400 B2
(45) Date of Patent: Dec. 12, 2023

(54) SYSTEM AND METHOD FOR MANAGING EVENTS IN A QUEUE OF A DISTRIBUTED NETWORK

(71) Applicant: CFPH, LLC, New York, NY (US)

(72) Inventor: Aleksey Solodovnik, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 17/876,303

(22) Filed: Jul. 28, 2022

(65) Prior Publication Data

US 2023/0005060 A1    Jan. 5, 2023

Related U.S. Application Data

(63) Continuation of application No. PCT/US2021/015761, filed on Jan. 29, 2021.

(60) Provisional application No. 62/968,415, filed on Jan. 31, 2020.

(51) Int. Cl.
*G06Q 40/04* (2012.01)
*G06F 9/54* (2006.01)

(52) U.S. Cl.
CPC ............. *G06Q 40/04* (2013.01); *G06F 9/542* (2013.01)

(58) Field of Classification Search
CPC .................................................... G06Q 40/04
See application file for complete search history.

(56) References Cited

U.S. PATENT DOCUMENTS

| 2016/0078538 | A1* | 3/2016 | Katsuyama | G06Q 40/04 705/37 |
| 2017/0193600 | A1* | 7/2017 | Mangutov | G06Q 40/04 |
| 2017/0366449 | A1* | 12/2017 | Loveless | H04L 47/125 |
| 2019/0385217 | A1* | 12/2019 | Loveless | G06Q 30/0635 |

FOREIGN PATENT DOCUMENTS

JP    2001034660 A    2/2001

OTHER PUBLICATIONS

PCT Search Report and Written Opinion dated May 25, 2021 corresponding to PCT Application No. PCT/US2021/015761 filed Jan. 29, 2021 (8 pages).

* cited by examiner

*Primary Examiner* — Jessica Lemieux

(57) ABSTRACT

System and method for electronic order management processing may include a sequencer that updates a parent order status maintained at the sequencer based on an order instruction and generates and multicasts to interface processors of a host server a sequence of events generated based on order instructions and a current order state of the parent order. An event may indicate an order instruction of or related to the parent order, confirmation of completion of a client order or an exchange order of a trade of a portion of the parent order, or an order instruction related to the parent order determined to be in conflict with the current order state. Events may be stored on a queue at a host server according to global sequence numbers assigned at the sequencer, and the interface processors may determine a next action for order processing based on the events on the queue.

21 Claims, 5 Drawing Sheets

SYSTEM AND METHOD FOR MANAGING EVENTS IN A QUEUE OF A DISTRIBUTED NETWORK

CROSS-REFERENCE TO RELATED APPLICATIONS

This application is a continuation of PCT/US21/15761 filed Jan. 29, 2021, which claims the benefit of U.S. Provisional Application No. 62/968,415 filed Jan. 31, 2020, which are incorporated by reference herein in their entireties.

TECHNICAL FIELD

The present disclosure generally relates to managing and processing sequenced events in a distributed network of servers.

BACKGROUND

Algorithmic trading relies heavily on the speed at which orders are sent to electronic market venues. As such, financial institutions invest heavily in computing and processing power. Today's networking speeds allow thousands of trades to execute in seconds, and financial institutions to capitalize on trading strategies based on microsecond differentials.

The execution of an order typically involves communication of electronic messages among multiple entities including, for example, brokers, financial institutions, market exchanges and electronic trading systems. The transmission, reception and processing of the messages occupy bandwidth of a network, consume memory and result in processing latencies. Processing latencies may include latency incurred within a system after the message to be processed has been received and before processing has been completed. In addition, electronic trading systems may be subject to failures, which typically require implementing a failover procedure among multiple servers of a distributed network that forms the electronic trading system.

Accordingly, there exists a need for method, apparatus and system that uses an improved computer architecture to minimize bandwidth usage, memory consumption and processing latencies, and to increase reliability, efficiency and speed of processing, in managing and processing an order for a financial instrument on an electronic trading system, and to provide a failover procedure that minimizes downtime and avoids data loss in the event of failure of a network component of the electronic trading system.

SUMMARY

In accordance with an aspect of the present disclosure, a method may include controlling, by at least one processor of a first sequencer, receiving, on a command multicast address, a command indicating an order instruction related to a parent order from one of first, second and third interface processors of a first host server, in which the first host server includes at least one second processor as the first, second and third interface processors and a first queue manager; performing order management processing, to determine an order state of the parent order and update the order state of the parent order to a current order state of the parent order, based on the order instruction, by applying the order instruction to a state machine at the first sequencer indicating an order history for the parent order; generating at least one event based on the order instruction and the current order state of the parent order, in which each of the at least one event includes (i) a header indicating a global sequence number corresponding to a time when the command is received at the first sequencer, a topic identifier indicating a publisher of the command and a topic sequence number for the topic identifier, and (ii) a payload indicating at least a portion of the order instruction; multicasting, on an event multicast address, the at least one event to the first queue manager, a second queue manager of a second host server and a second sequencer; wherein the first queue manager is configured to control: receiving the at least one event from the first sequencer; and adding the at least one event to a first queue of a memory of the first host server; wherein each of the first, second and third interface processors is configured to control: acquiring the at least one event from the first queue, and automatically in response to acquiring the at least one event from the first queue, determining from the at least one event a next action, in which the next action is at least one of (i) transmitting, on the command multicast address, another command indicating another order instruction related to the parent order to the first sequencer, (ii) transmitting, over a communication network, a message to execute a trade related to the parent order to a remote exchange computing device, (iii) transmitting, over the communication network, a trade confirmation to a client computing device, or (iv) updating a memory of a given interface processor such that information related to the parent order stored in the memory of the given interface processor reflects the current order state of the parent order at the state machine of the first sequencer; (A) automatically when a first given order instruction indicated by a first given command, received on the command multicast address, is to place an order for a first portion of a given first parent order of a given client, performing order management processing with the state machine to update an order state of the given first parent order to a current order state of the given first parent order based on the first given command; (B) automatically when a second given order instruction indicated by a single second given command, received on the command multicast address, indicates a trade of a second portion of the given first parent order of the given client has been completed, performing order management processing with the state machine to update the order state of the given first parent order to the current order state of the given first parent order, based on the single second given command, generating a first event as a client order trade confirm that indicates completion of a trade of the second portion of the given first parent order on the remote exchange computing device and a second event as an exchange order trade confirm that indicates completion of the trade of the second portion of the given first parent order on the remote exchange computing device, and multicasting, on the event multicast address, the first event and the second event to the first queue manager and the second queue manager; and (C) automatically when a given third order instruction indicated by a third command, received on the command multicast address, indicates a request to change an order state of the given first parent order, performing the order management processing with the state machine to update the order state of the given first parent order to the current order state of the given first parent order based on the third command, and determine whether the given third order instruction is in conflict with the current order state of the given first parent order, in response to determining that the request to change the order state is in conflict with the current order state of the given first parent order, generating a third event as a client order indicating rejection of the request to change the order state of the given first parent order, such that the third event will be ignored by each of the first, second and third interface processors, and multicasting, on the event multicast address, the third event to the first queue manager and the second queue manager; wherein the first queue manager is configured to control: receiving the first, second and third events from the first sequencer; and adding the first, second and third events to the first queue; wherein the first interface processor is configured to control: acquiring the second event from the first queue and transmitting a command response, over the communication network, to the client computing device confirming execution of the second portion of the given first parent order; and wherein the third interface processor is configured to control: acquiring the first event from the first queue and transmitting a command over the communication network to the remote exchange computing device to execute a trade of the second portion of the given first parent order.

In accordance with an aspect of the present disclosure, a system may include a first host server including at least one first processor as a first interface processor, a second interface processor, a third interface processor and a first queue manager; and a first sequencer including at least one second processor configured to control: receiving, on a command multicast address, a command indicating an order instruction related to a parent order from one of the first, second and third interface processors; performing order management processing, to determine an order state of the parent order and update the order state of the parent order to a current order state of the parent order, based on the order instruction, by applying the order instruction to a state machine of the first sequencer indicating an order history for the parent order; generating at least one event based on the order instruction and the current order state of the parent order, in which each of the at least one event includes (i) a header indicating a global sequence number corresponding to a time when the command is received at the first sequencer, a topic identifier indicating a publisher of the command and a topic sequence number for the topic identifier, and (ii) a payload indicating at least a portion of the order instruction; multicasting, on an event multicast address, the at least one event to the first queue manager, a second queue manager of a second host server and a second sequencer; wherein the first queue manager is configured to control: receiving the at least one event from the first sequencer; and adding the at least one event to a first queue of a memory of the first host server; wherein each of the first, second and third interface processors is configured to control: acquiring the at least one event from the first queue, and automatically in response to acquiring the at least one event from the first queue, determining from the at least one event a next action, in which the next action is at least one of (i) transmitting, on the command multicast address, another command indicating another order instruction related to the parent order to the first sequencer, (ii) transmitting, over a communication network, a message to execute a trade related to the parent order to a remote exchange computing device, (iii) transmitting, over the communication network, a trade confirmation to a client computing device, or (iv) updating a memory of a given interface processor such that information related to the parent order stored in the memory of the given interface processor reflects the current order state of the parent order at the state machine of the first sequencer; wherein the first sequencer is configured to control: (A) automatically when a first given order instruction indicated by a first given command, received on the command multicast address, is to place an order for a first portion of a given first parent order of a given client, performing order management processing with the state machine to update an order state of the given first parent order to a current order state of the given first parent order based on the first given command; (B) automatically when a second given order instruction indicated by a single second given command, received on the command multicast address, indicates a trade of a second portion of the given first parent order of the given client has been completed, performing order management processing with the state machine to update the order state of the given first parent order to the current order state of the given first parent order, based on the single second given command, generating a first event as a client order trade confirm that indicates completion of a trade of the second portion of the given first parent order on the remote exchange computing device and a second event as an exchange order trade confirm that indicates completion of the trade of the second portion of the given first parent order on the remote exchange computing device, and multicasting, on the event multicast address, the first event and the second event to the first queue manager and the second queue manager; and (C) automatically when a given third order instruction indicated by a third command, received on the command multicast address, indicates a request to change an order state of the given first parent order, performing the order management processing with the state machine to update the order state of the given first parent order to the current order state of the given first parent order based on the third command, and determine whether the given third order instruction is in conflict with the current order state of the given first parent order, in response to determining that the request to change the order state is in conflict with the current order state of the given first parent order, generating a third event as a client order indicating rejection of the request to change the order state of the given first parent order, such that the third event will be ignored by each of the first, second and third interface processors, and multicasting, on the event multicast address, the third event to the first queue manager and the second queue manager; wherein the first queue manager is configured to control: receiving the first, second and third events from the first sequencer; and adding the first, second and third events to the first queue; wherein the first interface processor is configured to control: acquiring the second event from the first queue and transmitting a command response, over the communication network, to the client computing device confirming execution of the second portion of the given first parent order; and wherein the third interface processor is configured to control: acquiring the first event from the first queue and transmitting a command over the communication network to the remote exchange computing device to execute a trade of the second portion of the given first parent order.

DETAILED DESCRIPTION

Figure 1:
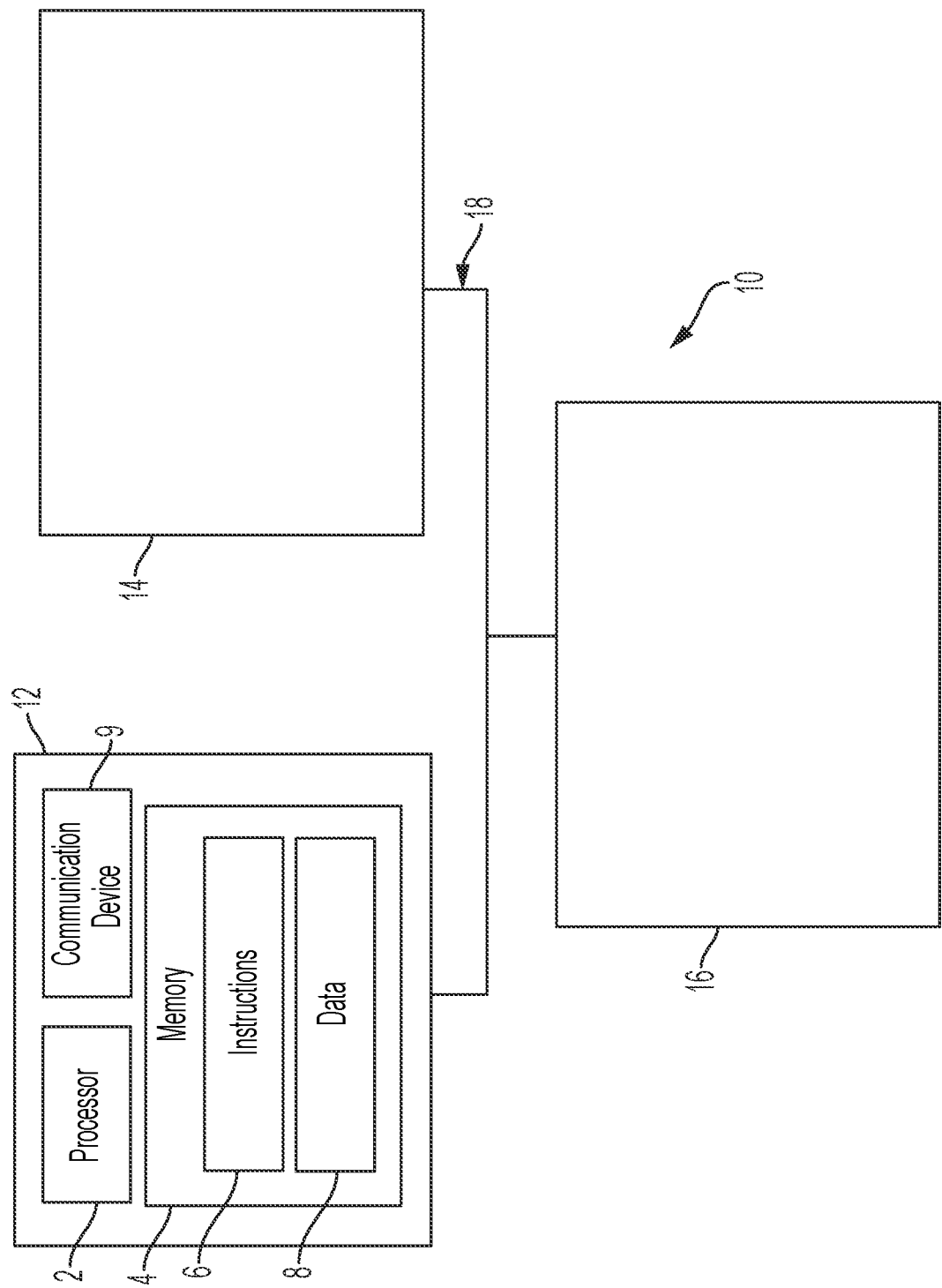
FIG. 1 is a block diagram of an exemplary electronic trading system according to the present disclosure.

The technology of the present disclosure relates to, by way of example, a computer and networking architecture that may control electronic order processing in an electronic trading system implemented as a distributed network, which provides for high-throughput of messages associated with processing an order for a financial instrument and minimizes downtime in the event of failure of a component of the system. In some embodiments, the technology of the present disclosure may provide for reliable and high-throughput delivery of messages associated with processing an order for a financial instrument, which minimizes bandwidth usage, processor usage, memory usage and processing latencies, by performing order management processing on messages related to an order for a financial instrument, such as to place an order, to complete a trade on at least a portion of an existing order, or to change a state of an existing order, using a status of a current order state of the existing order, where the status of the current order state of the existing order is maintained and updated in real time or substantially real time, based on all messages that relate to the existing order transmitted in the electronic trading system. While embodiments of the computer and networking architecture may be applied to various types of computer systems, the present disclosure is described in the context of an electronic trading system implemented by one or more computing devices communicating over a communication network. As systems may be programmed according to many different configurations, the particular configuration of an exemplary system described herein is not limited to the present disclosure.

The present disclosure may be implemented using a combination of computer hardware and computer software to form a specialized machine capable of performing operations. Embodiments of the present disclosure may be performed utilizing a combination of central processing units (CPUs), physical memory, physical storage, electronic communication ports, electronic communication lines and other computer hardware. The computer software may include at least a computer operating system and specialized computer processes described herein.

In the present disclosure, certain specific details are set forth in order to provide a thorough understanding of various disclosed embodiments. However, one skilled in the relevant art will recognize that embodiments may be practiced without one or more of these specific details, or with other methods, components, etc. In other instances, well-known structures associated with an electronic trading system have not been shown or described in detail to avoid unnecessarily obscuring descriptions of the embodiments.

The aspects, features and advantages of the present disclosure will be appreciated when considered with reference to the following description of examples and accompanying figures. In describing the exemplary embodiments of the disclosure illustrated in the drawings, specific terminology will be used for the sake of clarity. However, the disclosure is not intended to be limited to the specific terms used.

Example Systems

FIG. 1 illustrates a block diagram of an exemplary electronic trading system 10 in accordance with the present disclosure. The system 10 may include electronic trading host servers 12, 14 and 16. Each of the host servers 12, 14 and 16 may include the same or similar components and provide the same or similar functions as described in detail below. The host servers may be communicatively coupled to one another by a communication network 18. The host servers may facilitate managing and processing an order for a financial instrument, which includes receiving an instruction or an item of information that relates to any aspect of completing (filling) an order ("order instruction"), processing and analyzing an order instruction, and facilitating placing and executing a trade indicated by an order instruction, as described in detail below. In some embodiments, the system 10 may include at least two sequencers, each of which may be part of or associated with a respective host server, where at any time when the system is in an operating state, one sequencer of the system may operate as a primary sequencer and another sequencer may operate as a backup sequencer, and where, by performance of a failover procedure by a processor of the system 10, the backup sequencer may become a new primary sequencer for the system 10 in case of failure of the original primary sequencer. In some embodiments, advantageously according to the present disclosure, the primary sequencer may serve as a centralized order management processor that performs order management processing functions that decrease the number of messages generated, transmitted, received and processed by components of the system 10 in connection with processing, managing and completing an order for a financial instrument, which provides the technical advantages of minimizing usage of network bandwidth, processing resources and memory resources usage, as described in detail below. For ease of reference, the components of the host server 12 are described below to highlight the aspects of the present disclosure.

Referring to FIG. 1, and in particular to host server 12 as an exemplary embodiment of the host servers of the system 10, the server 12 may be in the form of a computing device that includes one or more processors 2, one or more memory 4, and other components commonly found in computing devices.

The memory 4 may store information accessible by the one or more processors 2, including instructions 6 that may be executed by the one or more processors 2. Memory 4 may also include data 8 that can be stored, manipulated, or retrieved by the processor. The data 8 may also be used for executing the instructions 6 and/or for performing other functions. The memory 4 may be any type of non-transitory media readable by the one or more processors, such as a hard-drive, solid state hard-drive, memory card, ROM, RAM, DVD, CD-ROM, write-capable, read-only memories, etc.

The instructions 6 may be any set of instructions capable of being read and executed by the one or more processors 2. The instructions may be stored in a location separate from the computing device, such as in a network attached storage drive, or locally at the computing device. The terms "instructions," "functions," "application," "steps," and "programs" may be used interchangeably herein.

Data 8 may be stored, retrieved and/or modified by the one or more processors 2 in accordance with the instructions 6. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted.

In addition, the server 12 may include a communication device 9 configured to provide wired or wireless communication capabilities.

The one or more processors 2 may be any type of processor, or more than one type of processor. For example, the one or more processors 2 may be CPUs from Intel, A M D, and Apple, or application specific integrated circuits (ASIC) or system on chips (SoCs).

Server 12 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc.

FIG. 1 illustrates the components of the server 12 as being single components, however, the components may actually comprise multiple processors, computers, computing devices, or memories that may or may not be stored within the same physical housing. For example, the memory may be a hard drive or other storage media located in housings different from that of the server 12. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the server 12 as described below may at least be partially performed at another server such as the servers 14 or 16. In one embodiment, functions described herein as performed by one or more of the servers may be distributed among one or more computing devices (servers) that operate as a cloud system.

Server 12 may also be interconnected to other computers via the network 18, which may be a local area network ("LAN"), wide area network ("WAN"), the Internet, etc. Network 18 and intervening nodes may also use various protocols including virtual private networks, local Ethernet networks, private networks using communication protocols proprietary to one or more companies, cellular and wireless networks, HTTP, and various combinations of the foregoing. Although only a few servers (computers) are depicted herein it should be appreciated that a network may include additional interconnected computers. It should further be appreciated that server 12 may be an individual node in a network containing a larger number of computers.

The instructions residing in a non-transitory memory may comprise any set of instructions to be executed directly (such as machine code) or indirectly (such as scripts) by processor 2. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Figure 2:
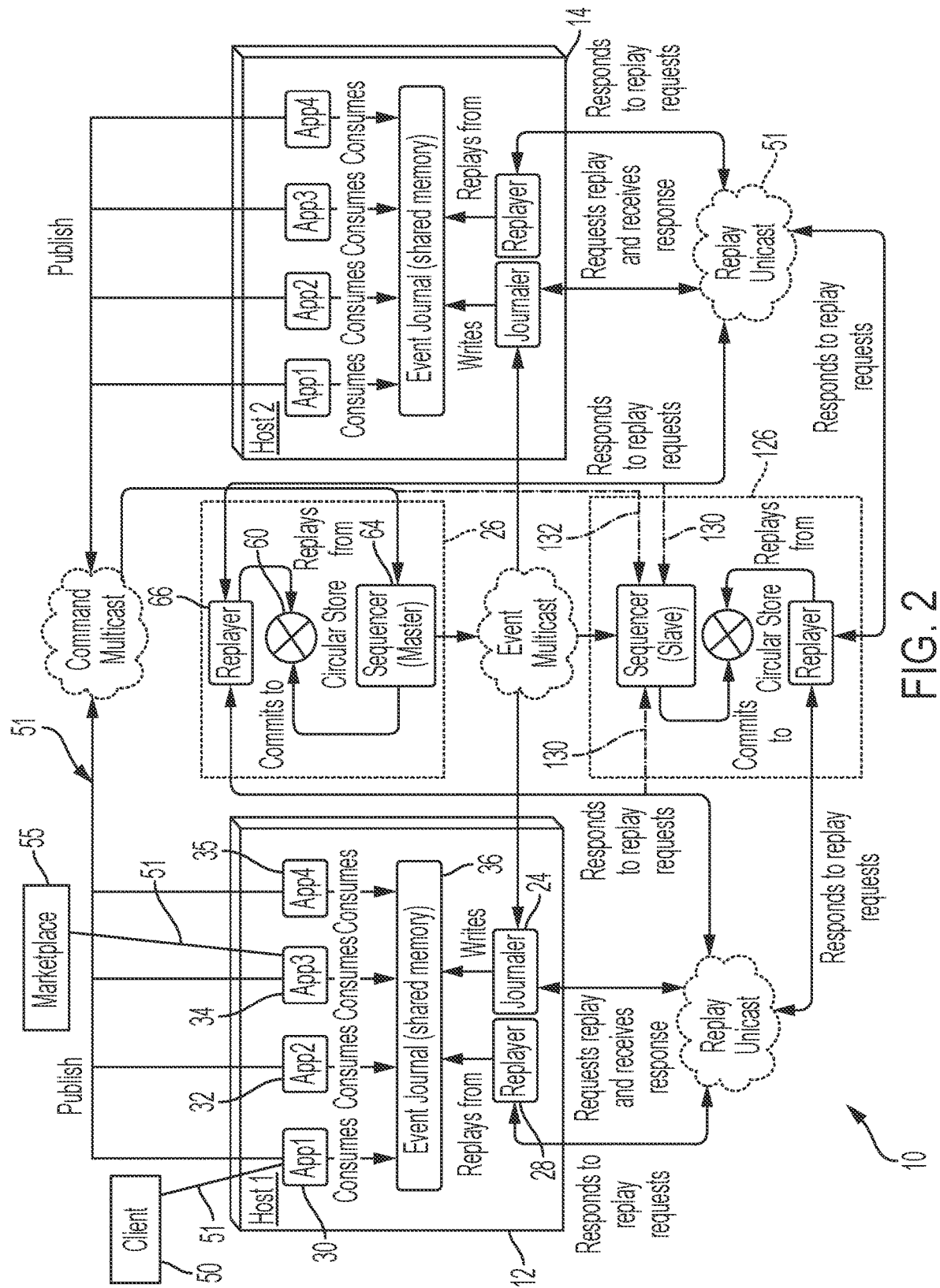
FIG. 2 is a block diagram of an exemplary electronic trading system according to the present disclosure.

Referring to FIG. 2, in some embodiments, each host server of the system 10 may be configured to implement specific functions and operations in accordance with embodiments of the present disclosure, and in some embodiments may be programmed with programs to perform some or all of the functions and operations described herein.

Referring to FIG. 2, the host server 12 may include a queue manager or journaler 24, a replayer 28, interface processors 30, 32, 34 and 35, and a buffer as an event journal or queue 36. Each of the journaler 24, replayer 28, and the interface processors 30, 32, 34 and 35 may include a processor and memory including instructions that implement functions of the respective component, as described below.

In some embodiments, the host server 12 may include a sequencer 26 that is associated with the host server 12. In some embodiments, the sequencer 26 may at least partially be of the host server 12, or be a component separate from and external to the host server. At any time during operation of the system 10, a single one of the sequencers in the system 10 may serve as a primary sequencer operating in correspondence with a designated, associated host server, and another different sequencer or sequencers in the system 10 may serve as a backup sequencer operating in correspondence with a designated, associated host server. Another different sequencer may become a new primary sequencer in the event of failure of the existing primary sequencer and be associated with a same host server as the previous primary sequencer or a different host server. In some embodiments, any one of the sequencers in the system 10 may be a redundant sequencer to another different one of the sequencers.

Each of the interface processors 30, 32, 34 and 35 may have communication capabilities and include a communications network interface. Referring to FIG. 2, each of the interface processors 30, 32, 34 and 35, as publishers, may control generating a command indicating an order instruction, and transmitting the command as an electronic message to the primary sequencer 26, by transmitting (publishing) the command as a downstream command packet on a dedicated command multicast address of the communication network 51. In this manner, an interface processor may contribute a new command from which at least one event is generated at the sequencer and included in a sequenced event stream. As described in detail below, an event may be a unique ordered command which relates to an order for a specific financial instrument, may be identified with a unique global sequence number as well as other identifying information, and may be generated by and transmitted from the sequencer 26.

Each of the interface processors may be a uniquely identified node of the system 10 whose identity is indicated by a topic identifier in a downstream command packet it sends. In some embodiments, each of the interface processors in the system 10 may be of a respective pair of interface processors, where one of the pair is a primary interface processor and the other of the pair is a backup interface processor. In the system 10, the primary interface processor and the backup interface processor of the pair may have the same topic identifier. In addition, each of the interface processors may (i) act as a subscriber capable to read and acquire events stored in the queue 36 and process information indicated in a payload of each event, and (ii) control determining and performing a next action based on processing of the information indicated in the payload together with other information related to trading of financial instruments, such as stored in a memory of the interface processor or obtained from a remote computing device over the communication network 51. In some embodiments, each of the interface processors may control receiving a stream of events directly via an event multicast from a primary sequencer. In some embodiments, each of the interface processors may acquire an event from the event journal and perform processing that generates a command related to an order for a financial instrument and transmit the command to the primary sequencer over the communication network 51.

In some embodiments, an interface processor that is operating as a primary interface processor of a pair of interface processors may perform instructions to control populating new commands in an internal buffer memory; keeping track of a topic sequence number, which corresponds to a command in a sequence of commands published by the interface processor, last used at the interface processor; adding a newly created command to a User Datagram Protocol (UDP) packet; when the UDP packet is full, transmitting the packet before attempting to add a new command to the packet; flushing the UDP packet in case it is not completely filled; receiving events from the event stream; and confirming that each command published by the interface processor matches a received event, where the received event constitutes an acknowledgement by the sequencer that a corresponding command from the interface processor has been received and processed by the sequencer. In some embodiments, an interface processor may perform instructions to control, when a published command remains unacknowledged for an extended period of time, retrying sending the command to the sequencer to provide that an event corresponding to the command is generated and received at the host servers of the system.

In addition, in some embodiments, an interface processor as a backup interface processor of a pair of interface processors may perform instructions of a Backup Operation to control creating and buffering a new command which is based on a new order instruction, keeping track of a last topic sequence number used by the primary interface processor of the pair by accessing the event journal of the host server, receiving events from the event stream, and acknowledging in its internal memory that an event has been generated for each command transmitted from the primary interface processor.

In addition, in some embodiments, an interface processor as a backup interface processor of a pair of interface processors may perform instructions of a Backup-to-Primary Failover Operation to control transmitting all buffered commands and, after transmitting all buffered commands, switching from operating as a backup interface processor of a pair of interface processors to the primary interface processor of the pair and operate as a primary interface processor.

In some embodiments, the interface processor 30 may serve as a client gateway and control receiving, from a computing device 50 of a client external to the system 10 over a communication network 51, an electronic message including an order instruction; and transmitting, over the communication network 51 to the computing device 50, order completion confirmation information. The order instruction from the client may be an order for a financial instrument, for example, buy or sell a financial instrument, or a request to change an order state of an existing order ("parent order") for a financial instrument, such as a request to cancel the parent order or reduce or increase the quantity of a financial instrument to be bought or sold relative to the quantity indicated in the parent order. In addition, the client gateway 30 may control validating a client or computing device of a client from which an electronic message including an order instruction is received. Further, the client gateway 30 may acquire an event stored in the event journal 36 by reading the event from the journal, and perform a further action based on a result of processing the contents of the event, such as, for example, transmitting a trade confirmation to the client's computing device 50 when the event indicates a trade of a financial instrument requested by the client as part of a parent order is completed.

The network 51 may be part of the communication network 18, or a communication network external to the network 18. In some embodiments, the computing device 50 of the client may be a remote trading terminal of an electronic trading system communicatively coupled with the host server 12 via the network 51.

It is to be understood that a plurality of clients via respective computing devices and client gateways may communicate with host servers of the system 10 to provide respective order instructions for financial instruments, and receive respective response messages from the client gateways that confirm whether trades are executed in accordance with the order instructions, and that the operations described below with respect to the client gateway 30 may be similarly performed by other client gateways of any of the host servers of the system 10.

In some embodiments, the interface processor 32 may serve as an algorithmic trading control component that controls analyzing order instructions indicated by respective events stored on the event journal 36, and generating an order instruction to fill an order, e.g., buy or sell a financial instrument, which may be transmitted as a command to the sequencer, based on parameters of a trading algorithm and an order instruction, such as a parent order, indicated by an event.

In some embodiments, the interface processor 34 may serve as an exchange gateway and control transmitting, over the communication network 51 to a computing device 55 of an external market access provider, a message to request an order be placed for a financial instrument, and receiving, from the computing device 55, an electronic message including trade confirmation information indicating an order was completed based on the request to place the order.

In some embodiments, the interface processor 35 may serve as a smart order router that controls analyzing order instructions indicated by respective events stored on the event journal 36, and generating an order instruction to fill an order, e.g., buy or sell.a financial instrument, which may be transmitted as a command to the sequencer, based on parameters of an order routing algorithm and an order instruction indicated by an event.

In some embodiments, the sequencer 26 may have communication capabilities including a communication network interface. In some embodiments, further referring to FIG. 3, the sequencer 26 may include a memory including a buffer 60, a state machine 62, a processor 64, and a replayer 66. In some embodiments, the processor 64 may execute instructions in memory to control receiving non-sequenced downstream command packets as messages including respective commands; for each command generating a corresponding event identified with a global sequence number in accordance with the time that the command is received at the sequencer; generating an additional event to be injected as an injected event into the event stream, based on an order instruction indicated in a command and a determination of a current order state of a parent order that is maintained updated at the sequencer, and identifying the additional event with a next unused global sequence number; keeping track of a last global sequence number used; and keeping track of a last topic sequence number, which is indicated in a command and indicates a sequence of order instructions from a same publisher. The processor 64, thus, may perform instructions to transform a command stream into a globally ordered event stream.

In some embodiments, the processor 64 may control receiving downstream command packets on a dedicated command multicast address; for each command generating a corresponding event with a global sequence number assigned in correspondence with the chronological order in which the command is received at the sequencer; and storing the events in global sequence number order in the buffer 60.

In some embodiments, the downstream command packet format for a command may include a field of a topic sequence number, which may be 64 bits; a field of a topic identifier (Topic ID), which may be 32 bits; and a payload. The Topic ID may be set to correspond to a pair of interface processors, and indicate a specific publisher pair, such as a pair of algorithmic interface processors, where the primary interface processor of the pair when operating normally publishes a command, such an order to buy a portion of the parent order or an order to cancel the parent order, and the backup interface processor of the pair stores in its memory an order instruction of an event acquired from the event journal 36 and which includes an indication, by way of the Topic ID, as being related to a command published by the primary interface processor of the pair.

The buffer 60 may be a circular buffer and configured with memory slots to store the events in the order the events are generated at the sequencer. In some embodiments, the buffer 60 may be of limited size so as to have a capability of storing about a maximum of hundreds of thousands of events.

In some embodiments, each event generated by a sequencer may include a header and a body. The header of an event may include or indicate a sending time, in milliseconds, from an interface processor, of a command to which the event corresponds, where the sending time is indicated by an interface processor as a publisher of the command packet within a command data packet; a global sequence number (GSN) that corresponds to a chronological time of receipt at the sequencer of a command from which an event is generated, or a next global sequence number following a last global sequence number used for an event generated at the sequencer; a topic identifier (T) corresponding to an interface processor that generates a command, such as buy or sell a particular financial instrument, such as a particular stock, e.g., GOOGLE; a topic sequence number (SN) indicating a chronology of order instructions for a particular topic identifier, where SN is set by a publisher of a command, increases monotonically and serves to track the order instructions from the publisher; a source identifier (SOURCE ID) indicating a publisher to which the order instruction of the event corresponds; and a target destination (TARGET ID) indicating a unique identifier of a group of one or more destinations, such as interface processors, that are designated to read the event from the buffer 36 of the host server, where a TARGET ID is set by a publisher when generating a command to which the event corresponds. In some embodiments, as described in detail below, a sequencer may create an additional event based on a command, and a topic identifier for the additional event may correspond to the sequencer that creates the additional event.

In some embodiments, downstream command packets may be received at the sequencer without timing information indicated in the packets.

Figure 5:
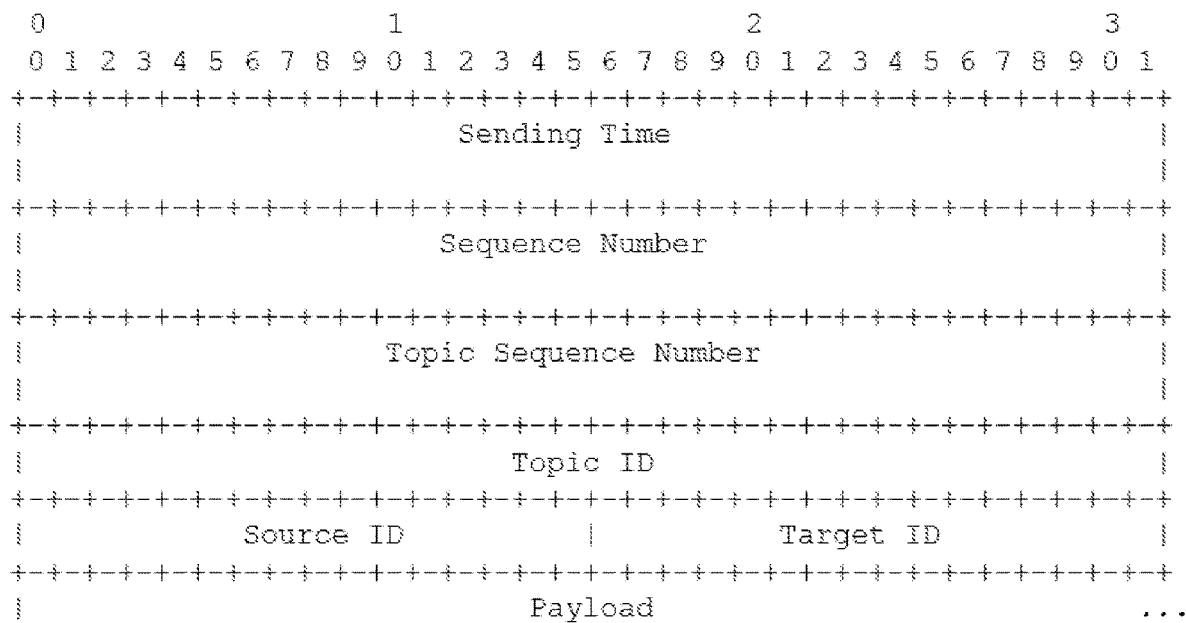
FIG. 5 illustrates a message format of an event according to the present disclosure.

In some embodiments, the message format of an event may be as illustrated in FIG. 5, where the fields of the data packet for an event have the following configuration: Sending Time 64 bits, Global Sequence Number 64 bits, Topic Sequence Number 64 bits, Topic ID 32 bits, Source ID 16 bits and Target ID 16 bits.

In some embodiments, the body or payload of an event may include details of or describe an order instruction (i) contained in a command received at the sequencer, or (ii) generated by the sequencer, based on a current order state of a parent order maintained at the sequencer and an order instruction of a command received at the sequencer.

For example, the payload of an event may describe an order instruction of an initial or parent order to buy a number of shares of the stock GOOGLE, where the order instruction is from a client indicated in a command generated and published by the client gateway, and where the command is within a downstream command packet received at the sequencer 26 at time t1. The header of this event may include a global sequencer number equal to 1 (assuming this is a first event generated by the sequencer when operation of the system 10 is commenced), a topic identifier T #1 identifying the client gateway 30 as a publisher of the buy order for GOOGLE stock, and a topic sequence number SN #1 indicating the event describes an initial order instruction published as a command by the client gateway 30. In addition, the payload of a second event may describe another order instruction to buy a number of shares of GOOGLE contained in a command published by another interface processor, such as the interface processor 32, and received at the sequencer at time t2 after time t1. The header of the second event may have the global sequencer number 2, when the electronic message with the second order instruction is a next command received at the sequencer after the command received at time t1; the topic identifier T #2, which identifies the command as having been published by the interface processor 32; and the topic sequence number SN #1, which indicates the event corresponds to a first order instruction from the interface processor 32. In some embodiments, the order instruction from which an event concerning the parent order is generated may originate from an interface processor of another host server, such as the host server 14.

In some embodiments, the sequencer 26 may execute instructions in a memory to control performance of operations that relate to a parent order and may result in generating an additional event as an injected event that is integrated into sequenced events transmitted from the sequencer, where the additional event is in addition to an event generated that corresponds to a command received at the sequencer 26. Advantageously, the generation of the additional event may conserve processing and memory resources, minimize bandwidth usage, and increase speed of processing of order instructions indicated in respective events in the system 10. The sequencer may generate an additional event, by performing order management processing using a history of all order instructions related to a parent order and that indicates a current order state of the parent order maintained in its memory. The generation of an additional event may occur, for example, when an order instruction of a command received by the sequencer indicates completion of at least a portion of a parent order. The generation of the additional event at the sequencer according the present disclosure, based on an order instruction of a command received at the sequencer and a current order state of the parent order maintained at the sequencer, may overcome the technical problem of latency and delayed processing, and consumption of bandwidth and memory resources, resulting from one interface processor needing to await acknowledgement of whether an order of an order instruction related to the parent order, which corresponds to a command from a different interface processor, has been completed. For example, the integration of an additional event into a stream of sequenced events that includes events respectively corresponding to commands received at the sequencer may avoid one interface processor, such as a client gateway, awaiting receipt of an acknowledgement message indicating completion of a trade of a portion of the parent order that the interface processor 32 initiated. In the absence of generation of the additional event, the client gateway would need to await (i) the another processor 32 to internally confirm that a trade for a portion of the parent order initiated by the interface processor 32 has been completed, and to transmit an acknowledgement message acknowledging the portion of the parent order has been completed, and (ii) transmission of another message, such as by a sequencer, responsive to the acknowledgement message and indicating to the client gateway that the trade for the portion of the parent order has been completed. By generating the additional event at the sequencer, speed of processing events in the system may be increased, number of processing operations performed may be reduced, and memory space for other usages, such as at the interface processors, may be increased.

In some embodiments, a sequencer may, by performing order management processing using a history of all order instructions related to a parent order and indicating a current order state of the parent order maintained in its memory, reduce latency and delayed processing, and consumption of bandwidth and memory resources in managing and processing an order instruction that is a request to change a state of a parent order ("change order state"), such as canceling the parent order or changing a quantity of the parent order. In some circumstances, an order instruction to change a state of a parent order, if implemented, may conflict with a current order state of the parent order. To avoid implementation of an order instruction that conflicts with a current order state of a parent order, typically in the prior art the order instruction to change order state is provided in an electronic message to an interface processor and the interface processor evaluates the order instruction in view of a history of order instructions stored in its memory. If based on determination from the history stored in its memory implementation of the order instruction would produce a conflict, in the prior art the interface processor typically generates and transmits a command indicating that the order instruction should be ignored, and a further message as an event that needs to be generated and transmitted to all interface processors indicating the order instruction of change order state is rejected and should be ignored by all publishers of the system. Advantageously, in the present disclosure, the sequencer, by performing order management processing on all commands related to a parent order to determine an order state of the parent order, such that a current, real time updated order state of the parent order is indicated in its memory based on all the order instructions related to the parent order published as commands in the system 10, may change the contents of the order instruction, such as to indicate rejection of the order instruction to cancel the parent order, and generate an event with the changed event contents indicating rejection of the change order state order instruction. This centralized processing of all order instructions related to a parent order transmitted in the system 10 at the sequencer advantageously provides that publishers may ignore the event, and avoid the need for a publisher to determine from processing, using data in its memory, that the order instruction for the change order state as indicated in an event is a conflict, and to generate and transmit a message as a command to a sequencer indicating the order instruction should be rejected, and the need for the sequencer to then generate and transmit an event indicating the order instruction should be rejected by all publishers. Thus, by the sequencer performing order management processing based on the order instruction of a command received at the sequencer and a current order state of the parent order maintained at the sequencer, the technical problem of latency and delayed processing, and excessive use of bandwidth, processing resources and memory resources may be overcome, as an interface processor does not need to determine whether an order instruction related to a parent order conflicts with a prior order instruction related to the parent order. Furthermore, an individual interface processor may avoid awaiting receipt of an acknowledgement message that a portion of the order has been completed, before taking a next action indicated by an event, such as to place a trade or modify or remove an order instruction for a parent order from its internal buffer. The action of changing the contents of an order instruction to be included in an event at the sequencer thus may increase speed of processing events in the system, reduce number of processing operations performed, and conserve and free memory space for other usages at the interface processors of the system.

In some embodiments, the state machine 62 may perform instructions to control processing order instructions to update a current order state of a parent order. For example, the state machine 62 may control processing an order instruction (i) constituting a parent order for a particular financial instrument from a client; (ii) generated based on processing an event from the queue of a host server by an interface processor, such as an interface processor 32; (iii) generated based on processing an event from the queue of a host server by a smart order router such as an interface processor 35; (iv) and for a same financial instrument as the parent order originating from the client, and transmitted in a command from the client gateway that is received at the sequencer after the command including an order instruction for the parent order is received at the sequencer.

In some embodiments, the state machine 62 may generate, and store in memory, a table that indicates a plurality of sets of order instructions for a respective plurality of parent orders. The table may store respective sets of order instructions referenced to a single parent order using a topic identifier and a topic sequence number. In some embodiments, the state machine may control performing order management processing to determine a current order state of a parent order by analyzing order instructions of an order history for a particular parent order stored in the memory, such as in a table, of the sequencer.

Figure 3:
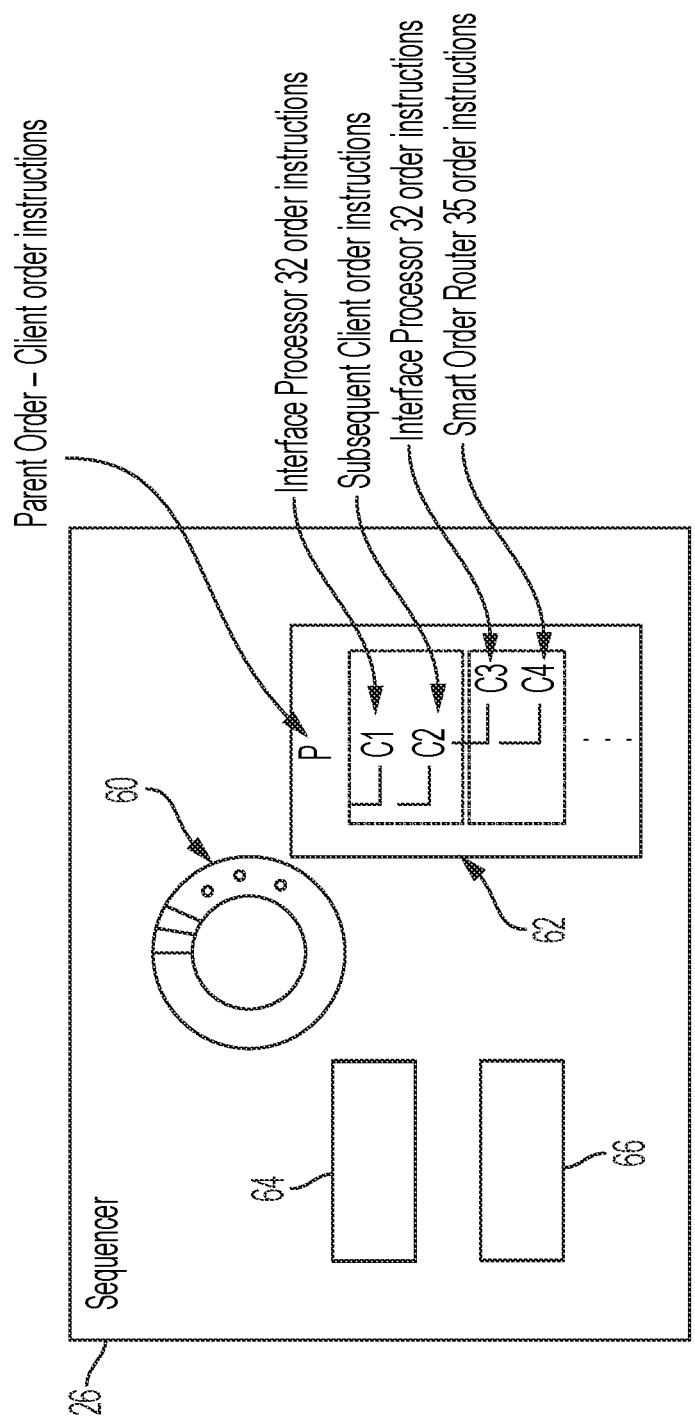
FIG. 3 is a block diagram of an exemplary sequencer according to the present disclosure.

Referring to FIG. 3, in some embodiments, the state machine may process an order instruction for a financial instrument from a client that constitutes a parent order (P) and set the order instruction of the parent order P as a top or first item in a chronological hierarchy indicating time of receipt at the sequencer. The state machine may process additional order instructions in respective commands received subsequent to the order instruction of the parent order P at the sequencer, and provide, in the hierarchy, that the first item is followed in sequence order by, for example, (i) a second item C1 corresponding to an additional order instruction received in a command from the interface processor 32, (ii) a third item C2 corresponding to an additional order instruction from the client received in a command from the client gateway 30; (iv) a fourth item C3 corresponding to an additional order instruction received in a command from the interface processor 32; and (iv) a fifth item C4 corresponding to an additional order instruction from a smart order router received in a command from the interface processor 35. As illustrated at the state machine 62, the additional order instructions relating to a parent order may be linked with each other and the parent order in a hierarchy for the parent order (P), where C1 and C2 are child orders of P, and C3 and C4 are child orders of C2.

In some embodiments, the state machine, by use of the hierarchy information associated with the parent order P, may analyze all order instructions for the particular financial instrument of the parent order P when an order instruction relating to the parent order P, such as cancel or change order state by reducing the number of shares to buy relative to the number of shares to buy indicated in the parent order P, is received in a command at the sequencer, to determine whether to generate an additional event. For example, the state machine may query the order table to extract order instructions corresponding to a history of order instructions associated with parent order and reconcile the history of order instructions for the parent order with the order instruction currently received at the sequencer in a command. After the history of order instructions is reconciled with the order instruction of the command currently received, the state machine 62 in real time may update an order state of the parent order, such as in the table, to an updated current order state in view of the received order instruction and the history, and generate an additional event based on the currently received order instruction and the updated current order state of the parent order in the table. As described above, the additional event may include a header indicating a global sequence number that is next after the last global sequence number used to identify an event corresponding to a command received at the sequencer. For example, when an order instruction of a command from an exchange gateway 34 indicates a trade of 100 shares of GOOGLE is completed, the state machine may update the order state of a parent order to buy 100 shares of GOOGLE by performing a roll-up of all other order instructions for the parent order. The roll-up updates the hierarchy information for the client's parent order for GOOGLE to eliminate all other order instructions for the parent order, and the sequencer may generate an additional event to indicate to the client gateway 30 that the parent order to buy 100 shares of GOOGLE is completed. In addition, the sequencer may generate an event corresponding respectively to the command indicating completion of the trade, such that an interface processor 32, which previously sent a command including an order to buy 100 shares of GOOGLE based on the parent order, where the order instruction of the command from the interface processor 32 caused the exchange gateway 34 to place the trade for 100 shares on an exchange to be executed, upon acquiring such event from the event journal, may confirm internally that its order and also the parent order to buy 100 shares of GOOGLE is completed.

In some embodiments, the state machine may perform instructions to control the order management processing to update the current order state of the parent order to indicate the parent order is at least partially filled and update a corresponding table describing the hierarchy information for the parent order to indicate the current order state of the parent order.

In some embodiments, the state machine may perform instructions to control the order management processing to, when an order instruction of a command is a request to change a state of an order of a parent order, such by canceling the order completely or at least in part, determine whether the requested change to the state of the order is in conflict with a current order state of the parent order. For example, the order instruction to change an order state from a client may be to amend the parent order, such to reduce the number of shares to buy from 100 to 50, or to cancel the parent order. In the event the order instruction to change the order state of the parent order is determined to conflict with a current order state of the parent order in the hierarchy, for example, 75 shares already have been purchased for a parent order to buy 100 shares and the amendment to the parent order is to buy only 50 shares, or all of the shares of the parent order to be purchased have already been purchased before the command including the order instruction to cancel or amend the parent order is received at the sequencer, the state machine may determine a conflict. When the state machine determines a conflict, the sequencer may control generating an event that does not contain the same order instruction to change order state, and instead indicates a rejection of the order instruction of the command indicating to change order state, such that the event may be ignored by any of the interface processors of the system. Based on the state machine determining a conflict upon receipt of a command to change an order state of the parent order, processing resources, bandwidth, and memory storage are saved, in that an individual interface processor does not need to internally process the order instruction of change an order state to determine a potential conflict, and then publish a command requesting an acknowledgement from the system that the change order state may be performed without causing a conflict with a previous action performed for the parent order.

In some embodiments, the state machine may perform order management processing on the order instruction currently received to determine whether a request is valid, such as whether necessary information for an order, such as price, size, trade parameters or the like, is missing from or exists in the order instruction. In the event the state machine determines the request is not valid, the state machine may update the state of the parent order to indicate an order instruction of a command relating to the parent order that was received is invalid. In this instance, the sequencer may control generating an event that indicates a rejection of the order instruction of the command, such that the event may be ignored by any of the interface processors, and also a particular interface processor that published the command determined to be invalid may become aware of the invalidity determination and publish another command, with the missing information, to provide for implementation of the intended order instruction in the system 10.

In some embodiments the sequencer may execute instructions to control dropping duplicate command packets with a topic sequence number that is the same as or less than a last known topic sequence number for a given topic.

Referring again to FIG. 2, the sequencer 26 may perform instructions to control transmitting, by multicasting, over the communication network on a dedicated event multicast address, an event to the queue manager 24, a queue manager of each of the host servers 14 and 16 and any backup sequencer, such as the sequencer 126.

The journaler 24 may perform instructions to control receiving, over the communication network, sequenced downstream event packets from the sequencer, storing each event from an event packet as a message in the event journal 36, and transmitting, over the communication network to a replayer of another server or a primary or backup sequencer, a replay request (a gap fill request) for an event packet(s) having a particular global sequence number range. In some embodiments, a replayer of the system 10, such as replayer 28 of the host server 12, may control receiving, over the communication network, a replay request (a gap fill request) for an event packet(s) having a particular global sequence number range; extracting events for a requested sequence number range from the replay request; accessing a memory, such as the event journal 36, to retrieve a requested event packet; and transmitting, over the communication network, an event packet having the requested global sequence number in response to the replay request. In some embodiments, the replayer may receive replay requests on a unicast address and transmit a response to a requestor to a unicast address thereof only if at least one event is found for a requested range. In some embodiments, the replayer of a sequencer, such as replayer 66 of the sequencer 26, may control receiving replay requests on a unicast address, retrieving a request event packet from the buffer 60, and transmitting, on a unicast address, an event packet having the requested global sequence number in response to the replay request. In some embodiments, the transmission of replay requests and responses to replay requests may be performed in the system when a determination is made from the event journal that a range of global sequence numbers is missing from an event stream stored at an event journal, such as may occur when there is a disruption to a communication network or a primary sequencer fails and a failover procedure to convert a backup sequencer to a primary sequence is performed.

In some embodiments, the journaler may perform instructions to control storing events using a local file system directly or via a mapped memory in the host server. In some embodiments, the journaler 24 may perform instructions to control receiving downstream event packets on an event multicast address over the communication network 51; determining whether an event packet has a global sequence number less than or equal to the global sequence number of a previously received event packet, and if yes, dropping such event as a duplicate; and storing in the buffer 36 downstream events with a global sequence number greater than the last known (stored) global sequence number plus one.

The journaler may perform instructions to control requesting, from of one or more replayers of the system 10 over the communication network on a unicast address, a replay request that requests re-sending an event whose global sequence number is determined to be missing from a sequence of received events in the buffer 36, to fill a gap in the sequence of global sequence numbers. In some embodiments, the replay requests from the replayer may be spaced from each other by a timeout interval. Further, in some embodiments, the journaler 24 may perform instructions to control storing in the buffer 36 all events from a last event packet received if the global sequence number is the next expected global sequence number and keeping track of the last global sequence number processed. Also, in some embodiments, the journaler 24 may perform instructions to control determining whether an event packet has a global sequence number that matches a next expected global sequence number of an event packet, and if yes, storing the event packet received, and if no, transmitting a replay request. In some embodiments, when event packets with missing global sequence numbers are received at the journaler, the journaler may perform instructions to control storing those missing event packets in the buffer and resuming storing event packets with not yet received global sequence numbers in the buffer from the resumed last tracked global sequence number.

In some embodiments, any one of the host servers 10, 12, 14 and an associated sequencer may be redundant to another one of the host servers and its associated sequencer. In some embodiments, the request for replay and response to replay request functions described above may be performed when a failover from the primary sequencer to a backup sequencer as the redundant sequencer is initiated. The global sequence number for each event may be used by the system 10 to ensure that data associated with an order instruction is not lost, in the event that a primary sequencer fails or is compromised, and another sequencer becomes a primary sequencer of the system 10.

In some embodiments, a sequencer 126 may perform instructions to control converting itself as the sequencer operating as a backup sequencer to a primary sequencer of the system. In some embodiments, for example, the sequencer 126, as a backup sequencer, may perform instructions to control receiving downstream event packets on an event multicast address, dropping duplicate event packets with a global sequence number less than or equal to last known global sequence number, and storing each individual event in a buffer. In addition, in some embodiments, the sequencer 126 may perform instructions of a Backup-to-Primary Failover Operation procedure that controls transmitting, over the communication network, a global sequence number query to each journaler in the system and awaiting response; receiving a response to the query over the communication network; comparing a global sequence number from each response to a locally stored value and, if necessary, performing a gap fill operation involving a communication exchange with a journaler and replayer of each host server of the system, to obtain any missing events from a combination of a replayer and journaler of a host server having an event with the highest global sequence number in its event journal. In addition, the sequencer 126 may perform instructions to control, after the event with a highest sequence number has been stored in its event journal, switching a mode of operation from a backup mode to a primary mode, after which the sequencer may perform operations as a primary sequencer described above for the sequencer 26. Referring to FIG. 2, when the backup sequencer 126 is transitioning to become a primary sequencer in the system 10, the sequencer 126 may send the global sequence number query, receive a response to the query, send a replay request, and receive a response to a replay request on a unicast address as indicated by reference line 130, and after the backup sequencer 126 becomes the primary sequencer for the system, receive commands on the command multicast address, as indicated by reference line 132.

Example Methods

Figure 4:
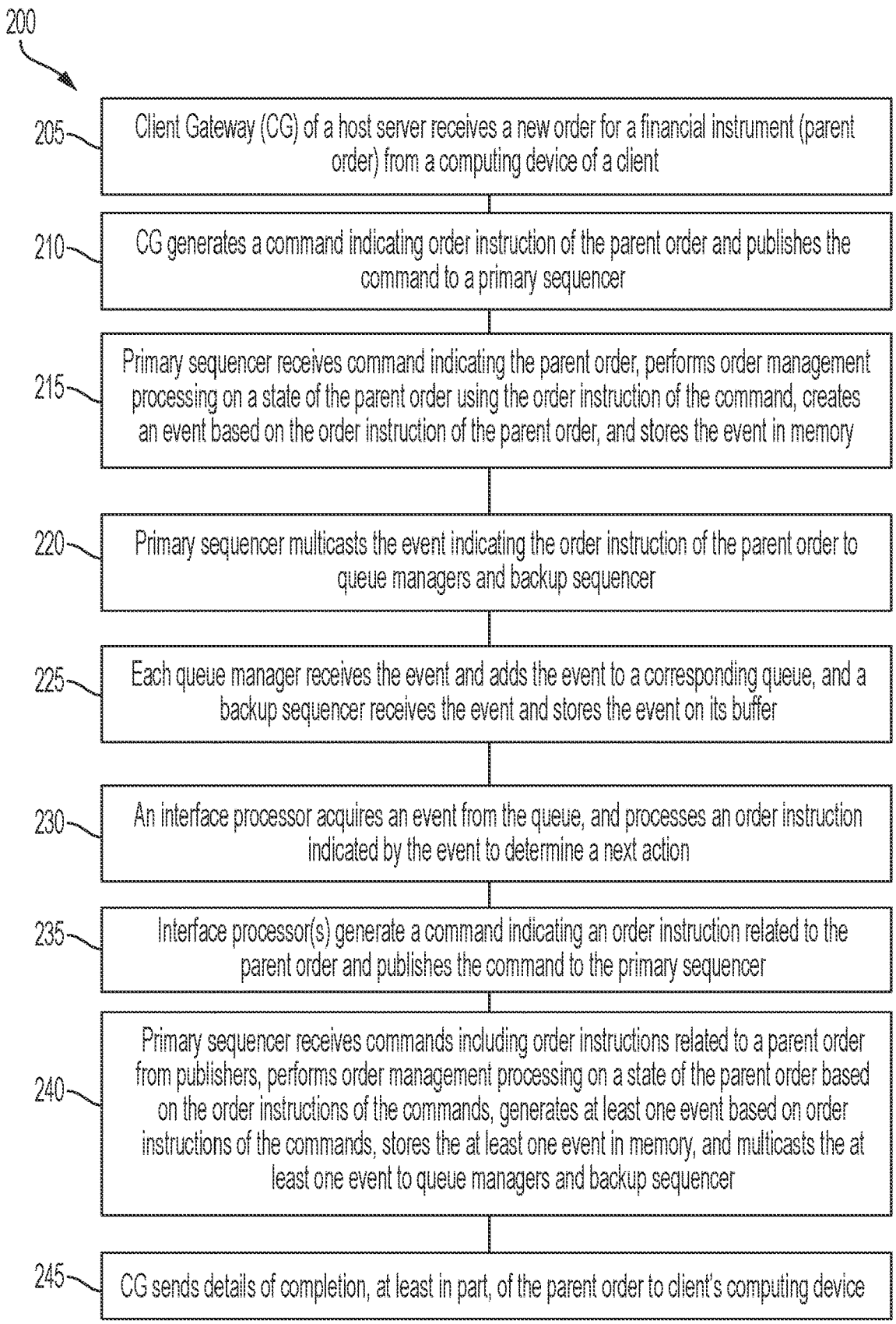
FIG. 4 illustrates an exemplary high level flow diagram of a method for electronic order processing according to the present disclosure.

For purposes of illustrating the features of the present disclosure, a high-level block diagram of an exemplary process 200, as shown in FIG. 4, which advantageously may minimize processing latency, bandwidth usage on a communication network, and usage of processing resources and memory, is described below in connection with operations performed at components of the system 10 as shown in FIGS. 1-3. The process 200 may manage and process events in a queue, in which the events indicate respective order instructions related to a parent order for a financial instrument, to facilitate high-throughput trading of financial instruments on a distributed network with a reduced number of processing operations, reduced memory usage and reduced bandwidth usage on a communication network, and to minimize downtime in case of failure of a network component of the system.

For purposes of illustration of the process 200, the host server 12 may be associated with the sequencer 26 which is operating as a primary sequencer of the system 10. In addition, the sequencer 126 may be operating as a backup sequencer and associated with the host server 14.

Referring to FIG. 4, in block 205, the client gateway 32 of the host server 12 may receive from the computing device 50 of a client, over a communication network 51, an order instruction for a financial instrument. The order instruction may be, for example, an initial or new order for a particular financial instrument (parent order).

In block 210, the client gateway 32 may generate a command indicating the order instruction of the parent order. The command may be included in an UDP packet and indicate details of the order instruction of the parent order. The client gateway 32 may track receipt of order instructions for a particular financial instrument received from a client. In particular, the client gateway 32 may, within the command that is generated based on a parent order, identify the order instruction for the parent order with the topic identifier (Topic ID) of the publisher of the command and a topic sequence number SN, in accordance with the protocol described above. The Topic, ID may serve as a common payload identifier for one or more commands in a same. UDP packet, where the topic sequence number SN identifies whether the command is a first or later, sequential order instruction for the same Topic ID. For example, the client gateway may generate the command for an order instruction that is a parent order to buy 1000 shares of IBM that includes the topic identifier T #1 and sequence number SN #1, and a command for a subsequent order instruction relating to the parent order, for example, buy 500 shares of IBM, that includes the topic identifier T #1 and sequence number SN #2.

Further in block 210, the client gateway 30 may publish, over communication network 51, on a command multicast address, an electronic message including the UDP packet with the command of the parent order for receipt by the primary sequencer 26.

In block 215, the sequencer 26 may receive, on the command multicast address, an UDP packet with one or more commands. For each command, the sequencer 26 may extract the corresponding order instruction from the UDP and based on the order instruction extracted determine details of the parent order, such as price, quantity, type and identity of a financial instrument forming the parent order, in addition, the sequencer 26 may extract the Topic ID and Topic Sequence Number of the command. Based on the extracted information from the command, the sequencer 26 may perform order management processing to determine an order state for a financial instrument indicated in the command. In some embodiments, the processor of the sequencer may operate as a state machine that determines whether the order instruction of the command constitutes a parent order, or a subsequent order related to the parent order, and maintain a real time, updated record of a current order state of a parent order in a hierarchy according to the order instructions related to the parent order of the commands respectively received at the sequencer. As described below, in the hierarchy for a parent order, items of respective order instructions may be linked to each other, and the hierarchy may indicate whether a particular order instruction related to a parent order has been completed. For example, for a command that indicates a parent order for a specific financial instrument, the state machine may determine that a history of an order for the specific financial instrument does not exist, in other words, the order instruction is a parent order, and therefore create a parent order P as first item in a hierarchy, as shown in FIG. 3.

Further in block. 215, the sequencer may generate an event that corresponds to the order instruction for the parent order indicated in the command. The event may include (i) a header indicating a global sequence number corresponding to a time when the command is received at the sequencer, the topic identifier indicated in the command and the topic sequence number for the topic identifier indicated in the command; and (ii) a payload describing the order instruction indicated by the command. Further in block 215, the sequencer may store the event in the circular buffer 60.

In block 220, the sequencer may multicast, on an event multicast address, the event to the queue manager 24, a queue manager of any other host server of the system 10, such as the host server 14, and the backup sequencer 126.

In block 225, the queue manager 24 may receive the event on the event multicast address, and responsive to receiving the event, add the event to the queue 36 in an order according to the global sequence number of the event. The events received at the sequencer 26 may be arranged in chronological order in the queue 36 according to their global sequence numbers, so that the events may be processed in sequence according to global sequence number by an interface processor of the host server 12, in addition, the queue manager of other host servers of the system 10 may similarly receive an event and store the event on the event journal thereof. Further, the backup sequencer 126 may receive the event on the event multicast address and store die event on a buffer of the backup sequencer.

After an event is stored on the queue of a host server, in block 230 one or more of the interface processors of the server 12 may acquire an event from the queue 36, and perform processing based on the order instruction indicated by the event to determine a next action. A next action, for example, may be to generate a command indicating an order instruction related to the parent order. In some embodiments, the next action may be determined automatically in response to the event being acquired from the queue.

In some embodiments, in block 230, an interface processor that is an exchange gateway may determine a next action, which is to place on order on an exchange, such as trade 500 shares of IBM, and transmit a request to place the order, over the communication network 51, to a remote exchange computing device. In some embodiments, when the next action is determined to be place an order on an exchange, in block 230 the exchange gateway may generate an order for a financial instrument to be placed on an exchange, such as buy 500 shares of IBM which is indicated in the parent order, and transmit the order, over the communication network 51, to the remote exchange computing device 55.

In some embodiments, in block 230 an interface processor that is an exchange gateway may determine a next action which is to apply the order information for a completed trade indicated in the event, to information stored in memory at the interface processor which relates to the parent order. In some embodiments, when the next action is to apply the order information for a completed trade indicated in the event, to information stored in memory at the interface processor which relates to the parent order, in block 230 the interface processor applies the order information for the completed trade indicated in the event to update its memory, so as to indicate the trade that was the subject of a command from the interface processor is completed.

In some embodiments, in block 230 the exchange gateway may, when the order information for a completed trade is indicated in the event, use the order information to perform an internal acknowledgement in the memory of the exchange gateway that a trade is completed related to the parent order. By such action, the information related to the parent order in the memory at the exchange gateway may include the same order information as in the hierarchy for the parent order at the sequencer.

In block 235, an interface processor, such as the interface processor 32 or 35 of the server 12 may, based on a next action determined in block 230, generate a command indicating an order instruction related to die parent order. In some embodiments, an interface processor 32 as an algorithmic trading processor, or an interface processor 35 as a smart order router, may, based on a determined next action, generate a command indicating another order instruction related to the parent order. The interface processor may include the command in an UDP packet with a topic identifier and sequence number assigned using the protocol convention as described above. The interface processors 32 and 35 may publish the commands on a command multicast address, for receipt by the primary sequencer 26.

In some embodiments, in block 235, an interface processor as the exchange gateway 34 may, based on receipt of a message over the communication network from a remote exchange computing device indicating a trade for at least a portion of the parent order was completed, generate a command indicating that a trade for the at least a portion of the parent order was completed. The interface processor 34 may include the command in an UDP packet with a topic identifier and a sequence number assigned using the protocol convention as described above. The interface processor 34 may similarly publish the command on a command multicast address, for receipt by the primary sequencer 26.

In some embodiments, in block 235, a client gateway may generate a command based on an order instruction related to the parent order that may be a subsequent order related to the parent order, and which may be received from the computing device 50 of the client over the communication network 51. For example, the order instruction of the parent order may be to buy 500 shares of GOOGLE at $100, and the order instruction of a subsequent order related to the parent order may be one of: buy an additional 250 shares of GOOGLE at $100, amend the parent order to buy only 250 shares of GOOGLE at $100, or cancel the parent order in its entirety. The client gateway may publish the command on a command multicast address, for receipt by the primary sequencer 26.

In block 240, the sequencer 26 may receive, on the command multicast address, an UDP packet with one or more commands related to the parent order. For each command received at the sequencer, the sequencer 26, automatically in response to receiving the command, may extract from the UDP packet the order instruction corresponding to the command, to determine details of an order instruction related to the parent order. Based on the extracted information for a command, the sequencer 26 automatically may perform order management processing to determine and update, in real time, a current order state of the parent order to which the order instruction in the command relates. In some embodiments, updating of the order state of the parent order to a current order state of the parent order may be performed in substantially real time, without delay, automatically upon receipt of a command at the sequencer.

In addition, in some embodiments, in block 240 the state machine may determine that a history of order instructions for a specific financial instrument exists, in other words, the order instruction relating to the parent order is subsequent the order instruction for the parent order; determine that the subsequent order instruction changes an order state of the parent order; and update the history of order instructions for the parent order P based on the subsequent order instruction. For example, a subsequent order instruction may be to buy 500 shares of IBM to complete a portion of the parent order P, which is buy 1000 shares of IBM. The subsequent order instruction may be identified as C1, as shown in FIG. 3. In some embodiments, the history of the parent order may include several subsequent order instructions related to the parent order P, where one subsequent order instruction is a child order C2 of buy 500 shares of IBM and may have several sub-child order instructions C3 and C4, for example, each to buy 250 shares of IBM.

In some embodiments, in block 240, the state machine may perform order management processing using a table in which order instructions related to a parent order are arranged in a hierarchy indicative of current order state of the parent order. In some embodiments, the subsequent order instructions of respective commands may, for example, originate from a client, or from any interface processor of any of the host servers in the system 10. When the order instructions are subsequent order instructions related to the parent order, the state machine of the sequencer may update the table to link the subsequent order instructions to the order instruction constituting the parent order and any other subsequent order instructions relating to the parent order, and indicate a chronological history of receipt of the subsequent order instructions at the sequencer in relation to other order instructions relating to the parent order received after the order instruction for the parent order. In some embodiments, the table may be updated to indicate the source of the subsequent order instructions, for example, the client gateway or another interface processor of the server 12.

Also in block 240, the sequencer may generate an event corresponding to the order instruction of the command, following updating the current order state of the parent order at the state machine.

Further in block 240, the sequencer may generate an additional event to inject into the event stream, based on an order instruction of a command and an updated current order state of a parent order determined by the state machine. In some embodiments, the additional event may include (i) a header indicating a global sequence number one greater than the global sequence number last assigned to an event generated at the sequencer, a topic identifier and a topic sequence number for the topic identifier according to the protocol convention described above; and (ii) a payload describing the order instruction for the additional event. Further in block 240, the sequencer may store the event in the circular buffer 60.

In some embodiments, the sequencer may generate an additional event based on a result of updating the hierarchy for the parent order. For example, in some embodiments, when the sequencer determines that the order instruction of the command indicates execution of an order that satisfies the entirety of the parent order, automatically in response to this determination and in real time the state machine may roll-up the hierarchy for the parent order, such that a current order state of the parent order in the memory of the state machine is the parent order is completely filled. In this circumstance, the sequencer may generate an additional event that may indicate to a client gateway that a parent order is completed. This additional event is in addition to the event generated from the command that indicates to an interface processor, which initiated the order related to the parent order that was completed, that the order placed by the interface processor is completed.

In block 245, the client gateway 22 may process an event to determine a parent order is partially or entirely executed, and transmit a message, over the communication network to the computing device 50 of the client, that confirms the parent order is partially or entirely executed. For example, the message may indicate an order to buy 1000 shares of IBM at the current market price, which was indicated as a financial instrument to be traded in a parent order, has been filled.

In some embodiments, a command may include a subsequent order instruction indicating completion of a portion of a trade that results in a portion or an entirety of the parent order being filled. The state machine in this example may, in block 240, perform order management processing that updates the current order state of the parent order based on the subsequent order instruction and a current state of the parent order in the hierarchy, and generates (i) an event A as an exchange order trade confirmation that is designated for acquisition by an interface processor and indicates completion of a trade for the portion of the parent order on a remote exchange computing device that was initiated by the interface processor, and (ii) an additional event B as a client order trade confirm that is designated for acquisition by a client gateway and indicates trade completion of the portion of the parent order on a remote exchange computing device. The sequencer may multicast, on the event multicast address, the two events A and B. The interface processor, such as interface processor 32, which transmitted a message to order a trade for the portion, may acquire the event A, which is designated for the interface processor, and update its internal memory and history to indicate an acknowledgement, namely, that the sequencer updated the hierarchy for the parent order based on completion of the trade indicated by the message to place the trade from the interface processor 32. In addition, the client gateway may acquire the additional event B, which is designated for the client gateway, and update its internal memory concerning the parent order and, as suitable, transmit over the communication network, an acknowledgement message that a portion of the parent order is completed, where the portion may be the entirety of the parent order.

In some embodiments, a command may include a subsequent order instruction to change an order state of a parent order. In some embodiments, in block 240, the state machine, based on the order instruction to change an order state of the parent order, may perform order management processing to update the order state of the parent order and determine whether the change order state order instruction is in conflict with a current order state of the parent order. A conflict may occur, for example, where the order instruction is to cancel the parent order and the parent order has been at least partially filled. Also, a conflict may occur where the subsequent order instruction is to amend the parent order to reduce the quantity to be traded, for example, the parent order is to buy 1000 and the amended order is to buy 500 shares, and more than the desired quantity for trading based on the amendment already has been traded, for example, 600 shares already have bought for the parent order. The sequencer, automatically and in real time in response to determining that the change order state indicated by the subsequent order instruction is in conflict with the current order state of the parent order, may generate a replacement event as a client order that has a different action indication than the subsequent order instruction, for example, reject instead of cancel, to indicate rejection of the order instruction to change the order state of the parent order. The sequencer may transmit the event with the indication to reject. An event having an indication of reject, such as in the header, [inventor—please confirm], may be ignored by any interface processor of the system.

In some embodiments, in block 230, when an event indicates to place a trade and an exchange gateway is indicated as a recipient within the event, the exchange gateway, upon acquiring the event, may transmit a request over the communication network to the remote exchange computing device to execute a trade for a portion of the financial instrument of the parent order. In addition, the exchange gateway may receive a message over the communication network from the remote exchange computing device confirming the portion of the financial instrument was traded.

An exemplary implementation of the present disclosure is illustrated with reference to electronic messages indicated below in Table 1, which may be transmitted over the network 51 when functions of blocks of process 200 as described above are performed in connection with system 10. For purposes of clarity, the messages are exemplified with relevant fields indicating a source of an order instruction and an order number corresponding to a particular order, namely, a client gateway order CO or exchange gateway order EO and an order number (e.g., CO #1), an instruction or action to be performed, such as BUY, trade TRD, cancel CXL or reject REJ, name of financial instrument, quantity and price. Also indicated at the left of the table are references to entities associated with the function indicated to the immediate right on the table, where FIX is an external computing device, such as client's computing device or a remote computing device of an exchange marketplace, CG is client gateway, OM/SEQ is sequencer, World is all nodes of the system capable of receiving an event, and EG is exchange gateway. It is to be understood that each message may include additional fields not indicated below.

TABLE 1

| | |
|---|---|
| [FIX => CG] | CO#1 BUY IBM 1000@$140.00 |
| [CG => OM/SEQ] | CO#1 BUY IBM 1000 @$140.00 <GSN#na,T#1,SN#1> |
| [OM/SEQ => World] | CO#1 BUY IBM 1000 @$140.00 <GSN#10,T#1,SN#1> |
| [ALGO => OM/SEQ] | EO#1 BUY IBM 500@ $140.00 <GSN#na,T#2,SN#1> |
| [ALGO => OM/SEQ] | EO#2 BUY IBM 500@ $140.00 <GSN#na,T#2,SN#2> |
| [OM/SEQ => World] | EO#1 BUY IBM 500@ $140.00 <GSN#11,T#2,SN#1> |
| [OM/SEQ => World] | EO#2 BUY IBM 500@ $140.00 <GSN#12,T#2,SN#2> |
| [EG => FIX] | EO#1 BUY IBM 500@ $140.00 |
| [EG => FIX] | EO#2 BUY IBM 500@ $140.00 |
| [FIX => EG] | EO#1 TRD IBM 500@ $140.00 |
| [FIX => EG] | EO#2 TRD IBM 500@$ 140.00 |
| [EG => OM/SEQ] | EO#1 TRD IBM 500@$140.00 <GSN#na,T#3,SN#1> |
| [EG => OM/SEQ] | EO#2 TRD IBM 500@$140.00 <GSN#na,T#3,SN#2> |
| [FIX => CG] | CO#1 CXLIBM 1000@$140.00 |
| [CG => OM/SEQ] | CO#1 CXLIBM 1000@$140.00 <GSN#na,T#1,SN#2> |
| [OM/SEQ => World] | EO#1 TRD IBM 500@$140.00 <GSN#13,T#3,SN#1> |
| [OM/SEQ => World] | CO#1 TRD IBM 500@$140.00 <GSN#14,T#4,SN#1> |
| [OM/SEQ => World] | EO#2 TRD IBM 500@$140.00 <GSN#15,T#3,SN#2> |
| [OM/SEQ => World] | CO#1 TRD IBM 500@$140.00 <GSN#16,T#4,SN#2> |
| [OM/SEQ => World] | CO#1 REJ IBM 1000@$140.00 <GSN#17,T#1,SN#2> |
| [CG => FIX] | CO#1 TRD IBM 1000@$140.00 |

Referring to Table 1, the computing device 50 of the client may transmit an electronic message, over the communication network to the client gateway 30, of an order to buy 1000 shares of IBM at $140. The client gateway 30 may, based on the order, generate a command having the following data fields: CO #1 BUY IBM 1000@$140.00. The client gateway 30, based on the order, may generate a command packet having the following data fields: CO #1 BUY IBM 1000@$140.00<GSN #na,T #1,SN #1>, which indicates a specific client gateway T #1 transmits an order to buy 1000 shares of IBM at $140 and the order instruction is the first order instruction SN #1 published from the client gateway. The client gateway then may publish the command packet as well store a record of the command in its memory.

The sequencer may receive the command packet for the order to buy 1000 shares of IBM at $140 from the client gateway, and generate an event based on the command of the command packet with the data fields CO #1 BUY IBM 1000@$140.00<GSN #10,T #1,SN #1>. The sequencer may assign a global sequence number to the event of GSN #10, which may be the next global sequence number not yet assigned by the sequencer. The other data field identifier information from the command may also be retained in the event. The sequencer may publish the event on the multicast event address, and the state machine at the sequencer may initiate a record in a hierarchy to establish an order state of a parent order based on the command.

The event may be received by the journaler of a host server and stored on the queue of the respective host server. An interface processor 32 as an algorithmic trading device may acquire and process the order instruction of the event and generate a command with an order instruction indicating to place an order to buy a portion of the parent order, namely, 500 shares of IBM. The command from the interface processor 32 is assigned a topic identifier T #2 and has the following data fields: EO #1 BUY IBM 500@$140.00<GSN #na,T #2,SN #1>. In addition, the interface processor 32 may process the order instruction of the event, and generate another command indicating to place an order to buy another portion of the parent order, namely, 500 shares of IBM. This another command may have the following data fields: EO #2 BUY IBM 500@$140.00<GSN #na,T #2,SN #2>.

The sequencer may receive the commands <GSN #na, T #2,SN #1> and <GSN #na,T #2,SN #2>, and generate respective corresponding events having the next global seqeunce numbers as EO #1 BUY IBM 500@$140.00<GSN #11,T #2,SN #1> and EO #2 BUY IBM 500 @S140.00<GSN #12,T #2,SN #2>. In addition, the state machine of the sequencer may update the hierarchy for the parent order to indicate EO #1 BUY IBM 500@$140.00 and EO #2 BUY IBM 500@$140.00 are child orders Child-1 and Child-2 to the parent order CO #1 BUY IBM 1000@$140.00. The sequencer may then multicast the events EO #1 BUY IBM 500@$140.00<GSN #11,T #2,SN #1> and EO #2 BUY IBM 500@$140.00 <GSN #12,T #2,SN #2>. The journaler 24 of the server 12 may receive these events and add them to the event journal 36.

The exchange gateway may acquire the events EO #1 BUY IBM 500@$140.00 <GSN #11,T #2,SN #1> and EO #2 BUY IBM 500@$140.00<GSN #12,T #2,SN #2> from the event journal 36, and based on processing the contents of the events, transmit over the communication network 51 to the remote computing device 55 an order corresponding to EO #1 BUY IBM 500 @$140.00 and another order corresponding to EO #2 BUY IBM 500@$140.00. The remote computing device 55 may execute the two orders on a marketplace and then transmit messages EO #1 TRD IBM 500@$140.00 and EO #2 TRD IBM 500@$140.00 over the communication network to the exchange gateway. The messages from the computing device 55 may serve as confirmations to the exchange gateway that the trades were completed respectively for each of the two orders to buy 500 shares of IBM.

The exchange gateway may, based on receipt of the messages confirming completion of each of the two orders to buy 500 shares of IBM, generate respective commands EO #1 TRD IBM 500@$140.00<GSN #na,T #3,SN #1> and EO #2 TRD IBM 500@$140.00 <GSN #na,T #3,SN #2> indicating the two trades for 500 shares of IBM were completed, and publish these commands for receipt by the sequencer.

In addition, the client gateway may receive a message from the client device over the communication network 51 indicating a subsequent order to cancel the parent order, as CO #1 CXL IBM 1000@S140.00. Based on receipt of the subsequent order to cancel the parent order, the client gateway may generate a command CO #1 CXL IBM 1000@$140.00 <GSN #na,T #1,SN #2>, and publish this command for receipt by the sequencer.

The sequencer may receive the commands EO #1 TRD IBM 500@$140.00 <GSN #na,T #3,SN #1> and EO #2 TRD IBM 500 @ S140.00<GSN #na,T #3,SN #2>, before the sequencer receives the command CO #1 CXL IBM 1000@$140.00<GSN #na,T #1,SN #2> from the client gateway. In this circumstance, the state machine may update the hierarchy for the parent order, based on the commands EO #1 TRD IBM 500 @$140.00 <GSN #na,T #3,SN #1> and EO #2 TRD IBM 500@$140.00<GSN #na,T #3,SN #2>, such that the heirarchy for the parent order is automatically rolled-up and the parent order is indicated as completed in the hierarchy. The sequencer may then generate an event EO #1 TRD IBM 500@$140.00<GSN #13,T #3,SN #1> corresponding to the command EO #1 TRD IBM 500@$140.00<GSN #na,T #3,SN #1>, and an additional event CO #1 TRD IBM 500@$140.00 <GSN #14,T #4,SN #1> based on the updating of the hierarchy for the parent order in accordance with receipt of the command EO #1 TRD IBM 500@$140.00<GSN #na,T #3,SN #1>. The additional event GSN #14 may serve to notify the interface processor 32 that a portion of the parent order is filled.

Further, the sequencer may generate an event EO #2 TRD IBM 500@$140.00 <GSN #15,T #3,SN #2> corresponding to the command EO #2 TRD IBM 500@$140.00, <GSN #na,T #3,SN #2>, and an additional event CO #1 TRD IBM 500@$140.00 <GSN #16,T #4,SN #2> based on the updating of the hierarchy for the parent order in accordance with receipt of the command EO #2 TRD IBM 500@$140.00 <GSN #na,T #3,SN #2>. The additional event GSN #16 may notify the client exchange that another portion of the parent order is filled.

As the sequencer processes the commands EO #1 TRD IBM 500@$140.00 <GSN #na,T #3,SN #1> and EO #2 TRD IBM 500@$140.00<GSN #na,T #3,SN #2> to generaete respective events before the command CO #1 CXL IBM 1000@$140.00 <GSN #na,T #1,SN #2> is processed, when the sequencer subsequently processes the command CO #1 CXL IBM 1000 @$140.00<GSN #na,T #1,SN #2>, the sequencer may determine, based on the current order state of the parent order indicated in the hierarchy for the parent order, that the current order state of the parent order is completed, such that a cancel order is not permitted for the parent order. Based on the determination that a cancel order is not permitted, the sequencer may generate an event CO #1 REJ IBM 1000@$140.00<GSN #17,T #1,SN #2> to reject the cancel order, and multicast the event for reception by the journaler and addition to the event journal of the respective host server. The designation "REJ" included in the event may indicate to all interface processors that the event should be ignored.

Advantageously, the generation and multicasting of the event with the designation "REJ", instead the designation "CXL", which occurs based on a determination of the current order state of parent order at the sequencer, may reduce processing, bandwidth and memory usage in the system. If a hierarchy indicating a current state of the parent order was not available at the sequencer, such that a current order state of the parent order may not be ascertained at the sequencer, the seqeuncer in response to receipt of the command to cancel likely may generate and multicast an event CO #1 CXL IBM 1000@$140.00 <GSN #17,T #1,SN #2>("cancel event"), which would be added to the event journal of the host server. The interface processor, such as the interface processor 32, that published the two commands to buy 500 shares, upon acquiring the cancel event, may determine from its memory that the two trades for the parent order are completed, and consequently generate and publish a command with a rejection designation replacing a cancel designation as follows CO #1 REJ IBM 1000@$140.00<GSN #na,T #1,SN #2>. The sequencer, based on upon receipt of the command CO #1 REJ IBM 1000@$140.00<GSN #na,T #1,SN #2>, may generate and multicast an event CO #1 REJ IBM 1000@$140.00<GSN #18,T #1,SN #2>, which would indicate that the subsequent order instruction to cancel the parent order should be ignored. Hence, the features of the present disclosure solve a technical problem by avoiding the need to generate and multicast two additional messages, one from an interface processor and another from the sequencer, to confirm that a cancelation order related to the parent order should be rejected, which consumes processing, bandwidth and memory resources of the system. The sequencer of the present disclosure, by performing order management processing based on received commands with a state machine that maintains an updated in real time, current order state of a parent order, may generate and transmit only one event to effectuate rejection of an order to cancel the parent order, thus saving processing, bandwidth and memory resources of the system, and also minimizing processing latencies.

In some embodiments, the sequencer may similarly replace an order to change a state of a parent order with content indicating rejection, similar to the circumstances described above for the order to cancel, which similarly may save processing, bandwidth and memory resources of the system, and also minimize processing latencies.

Referring again to Table 1, the client gateway, based on processing the events GSN #14 and GSN #16, may generate a confirmation message CO #1 TRD IBM 1000@$140.00 indicating that the parent order is completely filled, and transmit the confirmation message over the communication network to the computing device of the client.

In some embodiments, each sequencer in the system 10 may perform instructions from memory to execute a backup recovery process when the sequencer is operating as a backup sequencer, such that the sequencer may ensure that the events in the queue of the host server designated as associated with the sequencer match those events in the queue of another host server. The host recovery process may be initiated, for example, based a manually generated failover message transmitted over the network 18, or an automatic failover message generated, for example, by a processor at the host server 12 monitoring processing transactions at the host server.

In some embodiments, a backup to primary failover may be initiated at a backup sequencer via an interface of the system, such as at a host server. The interface may be a graphical user interface or some other command-based interface that provides for instructions to be transmitted into the system by a user. In some embodiments, the failover may be initiated automatically by a failure monitoring process that evaluates status of the primary sequencer and upon detecting a failover event initiates the failover. Exemplary criteria to automatically determine a failover event may include a process being in an "alarm" or nonresponsive state, and a buildup of particular type messages, which would indicate one or more components is not finishing its processing.

Based on the failover message, the backup sequencer may initiate a failover process to compare the events stored in the event journal of the host server associated with the backup sequencer to the events stored in the queues of each of the host servers, using global sequence numbers, to determine if the events of the respective queues are synchronized. It is to be understood that based on the failover message being sent, the sequencer designated as associated with the host server 12 may no longer process messages to generate new events.

In some embodiments, the comparison may be made at the host server associated with the primary sequencer, automatically responsive to the server associated with the backup sequencer transmitting the global sequence number of the last event stored in its queue to the host server associated with the primary sequencer. The host server associated with the primary server may determine if the global sequence number of the last event in its queue matches the received global sequence number. If there is match, the host server associated with the primary sequencer may transmit a proceed with failover instruction to the other server associated with the backup sequencer. If there is not a match, the re-player may determine any, events missing from the other server's queue based on the comparison, and re-transmit, by retrieving the events from the queue of the host server, the missing events to the backup sequencer. The queue manager at the sequencer may receive the re-transmitted events, and then add those events to the queue in sequence order according to the global sequence number.

After the proceed with failover instruction is received at the backup sequencer, or the queue of the backup sequencer is synchronized with the queues of the servers of the system, the backup sequencer may execute transfer of primary processing to itself, such that the backup sequencer now becomes the primary sequencer for the system 10 and generates new events starting with the next global sequence number after the global sequence number of the last event stored in its queue. In addition, the backup sequencer may transmit a request to the previous primary sequencer to forward all new commands to the backup sequencer. Accordingly, order instructions may be forwarded from the former primary sequencer to the new primary sequencer, once the backup sequencer becomes the primary sequencer.

In some embodiments, a backup to primary failover operation may include a backup sequencer receiving a failover notification indicating failure of the primary sequencer. The backup sequencer, automatically responsive to receiving the failover notification, may perform a back-up recovery procedure to obtain any event in the queue of the primary sequencer missing from a queue of the backup sequencer. In some embodiments, the backup sequencer may broadcast a retransmission request, on a unicast address, including a global sequence number of a last event stored in an event buffer of the backup sequencer to each re-player of host servers in the system. The backup sequencer may, responsive to receiving the failover notification, add to its event buffer each missing event obtained received from any re-player of the system, such that the highest global sequence number of an event in its event buffer is the same as the highest global sequencer number of an event it received.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A system comprising:
a first host server including at least one first processor as a first interface processor, a second interface processor, a third interface processor and a first queue manager; and
a first sequencer including at least one second processor configured to control:
receiving, on a command multicast address, a command indicating an order instruction related to a parent order from one of the first, second and third interface processors;
performing order management processing, to determine an order state of the parent order and update the order state of the parent order to a current order state of the parent order, based on the order instruction, by applying the order instruction to a state machine of the first sequencer indicating an order history for the parent order;
generating at least one event based on the order instruction and the current order state of the parent order,
in which each of the at least one event includes (i) a header indicating a global sequence number corresponding to a time when the command is received at the first sequencer, a topic identifier indicating a publisher of the command and a topic sequence number for the topic identifier, and (ii) a payload indicating at least a portion of the order instruction;
multicasting, on an event multicast address, the at least one event to the first queue manager, a second queue manager of a second host server and a second sequencer;
wherein the first queue manager is configured to control:
receiving the at least one event from the first sequencer; and
adding the at least one event to a first queue of a memory of the first host server;
wherein each of the first, second and third interface processors is configured to control:
acquiring the at least one event from the first queue, and automatically in response to acquiring the at least one event from the first queue,
determining from the at least one event a next action, in which the next action is at least one of (i) transmitting, on the command multicast address, another command indicating another order instruction related to the parent order to the first sequencer, (ii) transmitting, over a communication network, a message to execute a trade related to the parent order to a remote exchange computing device, (iii) transmitting, over the communication network, a trade confirmation to a client computing device, or (iv) updating a memory of a given interface processor such that information related to the parent order stored in the memory of the given interface processor reflects the current order state of the parent order at the state machine of the first sequencer;
wherein the first sequencer is configured to control:
(A) automatically when a first given order instruction indicated by a first given command, received on the command multicast address, is to place an order for a first portion of a given first parent order of a given client, performing order management processing with the state machine to update an order state of the given first parent order to a current order state of the given first parent order based on the first given command;
(B) automatically when a second given order instruction indicated by a single second given command, received on the command multicast address, indicates a trade of a second portion of the given first parent order of the given client has been completed,
performing order management processing with the state machine to update the order state of the given first parent order to the current order state of the given first parent order, based on the single second given command,
generating a first event as a client order trade confirm that indicates completion of a trade of the second portion of the given first parent order on the remote exchange computing device and a second event as an exchange order trade confirm that indicates completion of the trade of the second portion of the given first parent order on the remote exchange computing device, and
multicasting, on the event multicast address, the first event and the second event to the first queue manager and the second queue manager; and
(C) automatically when a given third order instruction indicated by a third command, received on the command multicast address, indicates a request to change an order state of the given first parent order,
performing the order management processing with the state machine to update the order state of the given first parent order to the current order state of the given first parent order based on the third command, and determine whether the given third order instruction is in conflict with the current order state of the given first parent order,
in response to determining that the request to change the order state is in conflict with the current order state of the given first parent order, generating a third event as a client order indicating rejection of the request to change the order state of the given first parent order, such that the third event will be ignored by each of the first, second and third interface processors, and
multicasting, on the event multicast address, the third event to the first queue manager and the second queue manager;
wherein the first queue manager is configured to control:
receiving the first, second and third events from the first sequencer; and
adding the first, second and third events to the first queue;
wherein the first interface processor is configured to control:
acquiring the second event from the first queue and transmitting a command response, over the communication network, to the client computing device confirming execution of the second portion of the given first parent order; and
wherein the third interface processor is configured to control:
acquiring the first event from the first queue and transmitting a command over the communication network to the remote exchange computing device to execute a trade of the second portion of the given first parent order.

2. The system of claim 1, wherein the order management processing updates the order state of the parent order to indicate the parent order is at least partially filled.

3. The system of claim 1, wherein the order management processing is performed with the state machine to update the order state of the given first parent order to indicate a conflict between the given third order instruction for the given first parent order and the current order state of the given first parent order.

4. The system of claim 1, wherein the order management processing is performed with the state machine to update the order state of the given first parent order to indicate the given third order instruction is invalid.

5. The system of claim 1, wherein the second interface processor is configured to control:
  acquiring, from the first queue, a fourth event having a fourth order instruction related to the given first parent order;
  generating a fifth command including a fifth order instruction based on processing of the fourth event; and
  multicasting, on the command multicast address, the fifth command to the first sequencer; and
  wherein the first sequencer is configured to control:
  receiving, on the command multicast address, the fifth command,
  performing order management processing with the state machine to indicate the fifth order instruction is related to the given first parent order in a hierarchy of given order instructions for the given first parent order arranged by time of receipt at the first sequencer;
  generating a fifth event indicating the fifth order instruction based on the order management processing performed based on the fifth order instruction; and
  multicasting, on the event multicast address, the fifth event to the first queue manager and the second queue manager; and
  wherein the first queue manager is configured to control:
  receiving the fifth event from the first sequencer; and
  adding the fifth event to the first queue.

6. The system of claim 1, wherein the first sequencer is configured to control:
  receiving, on the command multicast address, a fourth command including a fourth order instruction related to the parent order from a smart order router as one of the interface processors;
  performing order management processing with the state machine to update the order state of the parent order in a hierarchy of given order instructions related to the parent order, in which the fourth order instruction is indicated subsequently in the hierarchy to a fifth order instruction related to the parent order of a fifth command generated by the second interface processor based on a fifth event acquired from the first queue;
  generating a fourth event indicating the fourth order instruction for the parent order in a hierarchy of given order instructions for the parent order; and
  multicasting, on the event multicast address, the fourth event to the first queue manager and the second queue manager;
  wherein the first queue manager is configured to control:
  receiving the fourth event from the first sequencer; and
  adding the fourth event to the first queue.

7. The system of claim 1, further comprising the second host server, wherein the second sequencer is of the second host server and configured to control:
  receiving a failover notification indicating failure of the first sequencer, and
  automatically responsive to receiving the failover notification, performing a back-up recovery procedure
  to obtain any event in the first queue missing from a second queue maintained by a second queue manager of the second host server, by controlling broadcasting a retransmission request, on a unicast address, including a global sequence number of a last event stored in an event buffer of the second sequencer to each re-player of the first host server and the second host server, and
  to cause the second queue manager of the second host server to add each missing event obtained to the second queue thereof received from any re-player of the first host server and the second host server.

8. The system of claim 1, in which the state machine is updated for the given first parent order based on the order instruction, by the at least one second processor querying an order table of given parent orders stored in a memory of the first sequencer and indicating given order histories respectively for the given parent orders.

9. The system of claim 1, wherein the first sequencer is configured to control:
  automatically when the order management processing determines that the current order state of the given first parent order is the given first parent order is at least partially unfilled based on the first given command such that execution of the first portion of the given first parent order is permissible based on the first given command,
  generating a fourth event as an exchange order indicating to place an order for the first portion of the given first parent order on the remote exchange computing device, and
  multicasting, on the event multicast address, the fourth event to the first and second queue managers.

10. The system of claim 1, wherein the first sequencer is configured to control:
  when the given third order instruction of the third command indicates a request to cancel at least a portion of the given first parent order,
  performing the order management processing with the state machine to update the order state of the given first parent order to the current order state of the given first parent order based on the third command and determine whether the current order state of the given first parent order is completely filled,
  in response to determining that the current order state of the given first parent order is completely filled, generating a fourth event as a client order indicating rejection of the request to cancel the at least a portion of the given first parent order, such that the fourth event will be ignored by each of the first, second and third interface processors; and
  multicasting, on the event multicast address, the fourth event to the first queue manager and the second queue manager.

11. The system of claim 1, wherein the first sequencer is configured to control:
  when the given third order instruction of the third command indicates a request to amend the given first parent order,
  performing the order management processing with the state machine to update the order state of the given first parent order to the current order state of the given first parent order based on the third command and determine whether the current order state of the given first parent order indicates an amount of the given first parent order is available to amend without conflicting with a previous order instruction for the given first parent order,
  in response to determining that the current order state of the given first parent order is in conflict with the given third order instruction to amend the given first parent order, generating a fourth event as a client order indicating rejection of the request to amend the given first parent order, such that the fourth event will be ignored by each of the first, second and third interface processors; and multicasting, on the event multicast address, the fourth event to the first queue manager and the second queue manager.

12. The system of claim 1, in which a command as the parent order is received at the first interface processor over the communication network from the client computing device.

13. The system of claim 1, wherein the first host server includes a backup interface processor, and wherein the backup interface processor, in response to a failure of the first interface processor, is configured to:

buffer a new command based on a new order instruction in the first sequencer;

access an event journal of the first host server and receive a last topic sequence number used by the first interface processor; and for each command transmitted by the first interface processor, acknowledge in an internal memory of the backup interface processor that an event has been generated.

14. A method comprising:

controlling, by at least one processor of a first sequencer, receiving, on a command multicast address, a command indicating an order instruction related to a parent order from one of first, second and third interface processors of a first host server, in which the first host server includes at least one second processor as the first, second and third interface processors and a first queue manager;

performing order management processing, to determine an order state of the parent order and update the order state of the parent order to a current order state of the parent order, based on the order instruction, by applying the order instruction to a state machine at the first sequencer indicating an order history for the parent order;

generating at least one event based on the order instruction and the current order state of the parent order, in which each of the at least one event includes (i) a header indicating a global sequence number corresponding to a time when the command is received at the first sequencer, a topic identifier indicating a publisher of the command and a topic sequence number for the topic identifier, and (ii) a payload indicating at least a portion of the order instruction;

multicasting, on an event multicast address, the at least one event to the first queue manager, a second queue manager of a second host server and a second sequencer;

wherein the first queue manager is configured to control:

receiving the at least one event from the first sequencer; and adding the at least one event to a first queue of a memory of the first host server;

wherein each of the first, second and third interface processors is configured to control:

acquiring the at least one event from the first queue, and automatically in response to acquiring the at least one event from the first queue, determining from the at least one event a next action, in which the next action is at least one of (i) transmitting, on the command multicast address, another command indicating another order instruction related to the parent order to the first sequencer, (ii) transmitting, over a communication network, a message to execute a trade related to the parent order to a remote exchange computing device, (iii) transmitting, over the communication network, a trade confirmation to a client computing device, or (iv) updating a memory of a given interface processor such that information related to the parent order stored in the memory of the given interface processor reflects the current order state of the parent order at the state machine of the first sequencer;

(A) automatically when a first given order instruction indicated by a first given command, received on the command multicast address, is to place an order for a first portion of a given first parent order of a given client, performing order management processing with the state machine to update an order state of the given first parent order to a current order state of the given first parent order based on the first given command;

(B) automatically when a second given order instruction indicated by a single second given command, received on the command multicast address, indicates a trade of a second portion of the given first parent order of the given client has been completed, performing order management processing with the state machine to update the order state of the given first parent order to the current order state of the given first parent order, based on the single second given command, generating a first event as a client order trade confirm that indicates completion of a trade of the second portion of the given first parent order on the remote exchange computing device and a second event as an exchange order trade confirm that indicates completion of the trade of the second portion of the given first parent order on the remote exchange computing device, and multicasting, on the event multicast address, the first event and the second event to the first queue manager and the second queue manager; and (C) automatically when a given third order instruction indicated by a third command, received on the command multicast address, indicates a request to change an order state of the given first parent order, performing the order management processing with the state machine to update the order state of the given first parent order to the current order state of the given first parent order based on the third command, and determine whether the given third order instruction is in conflict with the current order state of the given first parent order, in response to determining that the request to change the order state is in conflict with the current order state of the given first parent order, generating a third event as a client order indicating rejection of the request to change the order state of the given first parent order, such that the third event will be ignored by each of the first, second and third interface processors, and multicasting, on the event multicast address, the third event to the first queue manager and the second queue manager;

wherein the first queue manager is configured to control:

receiving the first, second and third events from the first sequencer; and adding the first, second and third events to the first queue;

wherein the first interface processor is configured to control:

acquiring the second event from the first queue and transmitting a command response, over the communication network, to the client computing device confirming execution of the second portion of the given first parent order; and wherein the third interface processor is configured to control:
  acquiring the first event from the first queue and transmitting a command over the communication network to the remote exchange computing device to execute a trade of the second portion of the given first parent order.

15. The method of claim 14, wherein the order management processing updates the order state of the parent order to indicate the parent order is at least partially filled.

16. The method of claim 14, wherein the order management processing is performed with the state machine to update the order state of the given first parent order to indicate a conflict between the given third order instruction for the given first parent order and the current order state of the given first parent order.

17. The method of claim 14, wherein the order management processing is performed with the state machine to update the order state of the given first parent order to indicate the given third order instruction is invalid.

18. The method of claim 14, wherein the second interface processor is configured to control:
  acquiring, from the first queue, a fourth event having a fourth order instruction related to the given first parent order;
  generating a fifth command including a fifth order instruction based on processing of the fourth event; and
  multicasting, on the command multicast address, the fifth command to the first sequencer; and
  further comprising controlling, by the at least one processor:
  receiving, on the command multicast address, the fifth command,
  performing order management processing with the state machine to indicate the fifth order instruction is related to the given first parent order in a hierarchy of given order instructions for the given first parent order arranged by time of receipt at the first sequencer;
  generating a fifth event indicating the fifth order instruction based on the order management processing performed based on the fifth order instruction; and
  multicasting, on the event multicast address, the fifth event to the first queue manager and the second queue manager; and wherein the first queue manager is configured to control:
  receiving the fifth event from the first sequencer; and
  adding the fifth event to the first queue.

19. The method of claim 14, further comprising:
controlling, by the at least one processor:
receiving, on the command multicast address, a fourth command including a fourth order instruction related to the parent order from a smart order router as one of the interface processors;
performing order management processing with the state machine to update the order state of the parent order in a hierarchy of given order instructions related to the parent order, in which the fourth order instruction is indicated subsequently in the hierarchy to a fifth order instruction related to the parent order of a fifth command generated by the second interface processor based on a fifth event acquired from the first queue;
generating a fourth event indicating the fourth order instruction for the parent order in a hierarchy of given order instructions for the parent order; and
multicasting, on the event multicast address, the fourth event to the first queue manager and the second queue manager;
wherein the first queue manager is configured to control:
receiving the fourth event from the first sequencer; and
adding the fourth event to the first queue.

20. The method of claim 14, further comprising
controlling, by the at least one processor, when the first sequencer is in a backup operating state,
receiving a failover notification indicating failure of a given primary sequencer, and
automatically responsive to receiving the failover notification, performing a back-up recovery procedure
to obtain any event in a given queue of the given primary sequencer missing from the first queue, by controlling broadcasting a retransmission request, on a unicast address, including a global sequence number of a last event stored in the first queue to each re-player of at least the second host server, and
to cause the first queue manager to add each missing event obtained to the first queue received from any re-player.

21. The method of claim 14, in which the state machine is updated for the given first parent order based on the order instruction, by the at least one processor querying an order table of given parent orders stored in a memory of the first sequencer and indicating given order histories respectively for the given parent orders.

\* \* \* \* \*